(12) United States Patent
McIntyre et al.

(10) Patent No.: US 11,403,960 B2
(45) Date of Patent: Aug. 2, 2022

(54) PRODUCT DEMONSTRATION CREATION TOOLSET THAT PROVIDES FOR ENTRY OF PERSISTENT DATA DURING USE OF THE DEMONSTRATION

(71) Applicant: ADP, Inc., Roseland, NJ (US)

(72) Inventors: Dale McIntyre, Alpharetta, GA (US); Bruce Kolofske, Alpharetta, GA (US); Elizabeth Hebert, New York, NY (US); Ronald Carey, Alpharetta, GA (US); Jason E. Smith, Fort Myers, FL (US); Madhuri Swargam, Hyderabad (IN)

(73) Assignee: ADP, Inc., Roseland, NJ (US)

( * ) Notice: Subject to any disclaimer, the term of this patent is extended or adjusted under 35 U.S.C. 154(b) by 76 days.

(21) Appl. No.: 16/532,893

(22) Filed: Aug. 6, 2019

(65) Prior Publication Data

US 2021/0043107 A1 Feb. 11, 2021

(51) Int. Cl.
| | |
|---|---|
| G09B 19/00 | (2006.01) |
| G06F 3/04842 | (2022.01) |
| G06F 3/04845 | (2022.01) |
| G06F 9/451 | (2018.01) |

(52) U.S. Cl.
CPC ..... *G09B 19/0053* (2013.01); *G06F 3/04842* (2013.01); *G06F 3/04845* (2013.01); *G06F 9/451* (2018.02)

(58) Field of Classification Search
CPC . G09B 19/0053; G06F 9/451; G06F 3/04842; G06F 3/04845
See application file for complete search history.

(56) References Cited

U.S. PATENT DOCUMENTS

| | | |
|---|---|---|
| 5,857,201 A | 1/1999 | Wright, Jr. et al. |
| 7,613,589 B2 | 11/2009 | Hosagrahara |

(Continued)

FOREIGN PATENT DOCUMENTS

CN 101446979 A 6/2009

OTHER PUBLICATIONS

Sotoca, "How to Create an Interactive Prototype With Marvel," Dec. 16, 2014, https://webdesign.tutsplus.com/tutorials/how-to-create-an-interactive-prototype-with-marvel-cms-22683.

(Continued)

*Primary Examiner* — Jeremy L Stanley
(74) *Attorney, Agent, or Firm* — Yee & Associates, P.C.

(57) ABSTRACT

A product training and demonstration tool includes a computer system. The tool also includes a demonstration creation interface in the computer system, wherein the demonstration creation interface is configured to create a demonstration responsive to user input. The tool also includes an upload tool configured to upload a plurality of images to the demonstration. The tool also includes an image editing tool configured to create a clickable hotspot on a first one of the images in response to user input and to create a data entry display on a second one of the images in response to user input. The clickable hotspot includes a data entry field. The tool is configured to populate the display with data entered into the data entry field such that when the user is navigating through the demonstration, data entered into the data entry field will also be displayed in the data entry display.

20 Claims, 17 Drawing Sheets

(56) References Cited

U.S. PATENT DOCUMENTS

| | | | |
|---|---|---|---|
| 7,627,648 B1* | 12/2009 | Mehta | G06F 16/9577 709/217 |
| 7,836,147 B2 | 11/2010 | Reding et al. | |
| 7,904,079 B1 | 3/2011 | Lundy et al. | |
| 8,688,491 B1 | 4/2014 | Shenoy et al. | |
| 9,626,068 B2* | 4/2017 | Maloney | G06F 16/4393 |
| 9,787,752 B2* | 10/2017 | Zhu | H04L 67/02 |
| 10,229,096 B1* | 3/2019 | Bienkowski | G06F 8/75 |
| 10,628,278 B2 | 4/2020 | Anderson et al. | |
| 2001/0039552 A1* | 11/2001 | Killi | G09B 19/0053 715/234 |
| 2002/0023111 A1* | 2/2002 | Arora | G06F 40/166 715/234 |
| 2002/0126990 A1 | 9/2002 | Rasmussen et al. | |
| 2006/0129913 A1* | 6/2006 | Vigesaa | G06F 40/18 715/250 |
| 2007/0245227 A1* | 10/2007 | Hyland | G06Q 10/10 715/234 |
| 2009/0083710 A1* | 3/2009 | Best | G06F 9/453 717/120 |
| 2011/0055066 A1* | 3/2011 | Themmen | G06Q 40/06 705/35 |
| 2012/0159376 A1* | 6/2012 | Crow | G06F 3/04845 715/780 |
| 2012/0185066 A1 | 7/2012 | Kem et al. | |
| 2012/0204102 A1* | 8/2012 | Gwin | G06F 40/186 715/253 |
| 2014/0289599 A1* | 9/2014 | Huggins | G09B 5/06 715/209 |
| 2015/0007034 A1* | 1/2015 | Xu | G06F 3/0484 715/730 |
| 2015/0007040 A1* | 1/2015 | Xu | G06F 3/0484 715/738 |
| 2015/0032887 A1 | 1/2015 | Pesek et al. | |
| 2015/0206446 A1* | 7/2015 | Gupta | G09B 5/08 434/362 |
| 2015/0277725 A1* | 10/2015 | Masterson | G06F 3/04842 715/753 |
| 2015/0310488 A1* | 10/2015 | Hess | G06F 16/245 705/14.55 |
| 2015/0346969 A1* | 12/2015 | Strabbing | G06F 3/04845 715/723 |
| 2016/0062961 A1* | 3/2016 | Zhu | H04L 67/02 715/208 |
| 2016/0188125 A1* | 6/2016 | Kaplan | G06F 3/0481 715/730 |
| 2017/0068743 A1* | 3/2017 | Kumar | G06F 40/114 |
| 2017/0220232 A1* | 8/2017 | Gilmore | G06F 3/0483 |
| 2019/0068703 A1* | 2/2019 | Vora | H04L 67/1095 |

OTHER PUBLICATIONS

"Adding Interactivity," Dec. 17, 2018, InVision, https://support.invisionapp.com/hc/en-us/articles/115000648743-Adding-Interactivity.

"How To: Make your app demo clickable with the HOTSPOT control," 2017, AppDemoStore, http://blog.appdemostore.com/2015/10/how-to-create-clickable-areas-in-your.html.

Office Action, dated Jun. 11, 2020, regarding U.S. Appl. No. 16/533,027, 14 pages.

Final Office Action dated Dec. 1, 2020 regarding U.S. Appl. No. 16/533,027; 14 pgs.

Office Action, dated Mar. 24, 2021, regarding U.S. Appl. No. 16/533,027, 14 pages.

* cited by examiner

PRODUCT DEMONSTRATION CREATION TOOLSET THAT PROVIDES FOR ENTRY OF PERSISTENT DATA DURING USE OF THE DEMONSTRATION

BACKGROUND INFORMATION

1. Field

The present disclosure relates generally to an improved computer system and, in particular, to improved methods for creating and using software product demonstrations, and, even more particularly, to improved methods of implementing demonstrations to provide for entry of persistent data during execution of the demonstration where the data is populated to other screens in the presentation.

2. Background

Software is ubiquitous in the modern world. Software is designed for use by many different people in different fields. Often the end users of the software are not programmers or other software sophisticated persons. Furthermore, many modern software products can be quite complicated and provide a number of tools to a user. However, becoming proficient at the software may be difficult without education. Software product demonstrations are utilized to teach users how to use a software product. Similar demonstrations may also be used as a marketing tool to demonstrate to a potential customer the advantages of purchasing a particular software product.

The people creating and using the product demonstrations may also not be people skilled and knowledgeable about software programming. Thus, many demonstrations require not only, for example, the sales person, to be involved, but also require additional support from an IT staff or department. It would be desirable to have a tool for creating demonstrations that requires fewer human resources as well as being simple enough for non-IT people to utilize.

SUMMARY

An illustrative embodiment provides a product training and demonstration tool. The product training and demonstration tool includes a computer system and a demonstration creation interface in the computer system, wherein the demonstration creation interface is configured to create a demonstration responsive to user input. The product training and demonstration tool also includes an upload tool in the computer system, wherein the upload tool is configured to upload a plurality of images to the demonstration. The product training and demonstration tool also includes an image editing tool in the computer system, wherein the image editing tool is configured to create a clickable hotspot on a first one of the images in response to user input and to create a data entry display on a second one of the images in response to user input. The clickable hotspot includes a data entry field. The product training and demonstration tool is configured to populate the display with data entered into the data entry field such that when the user is navigating through the demonstration, data entered into the data entry field will also be displayed in the data entry display.

Another illustrative embodiment provides a method in a computer system for creating a product training or product demonstration presentation. The method includes providing, by the computer system, a first interface for uploading presentation data to a server. The method also includes receiving, by the computer system, presentation data. The method also includes providing, by the computer system, a second interface for assigning hot spots and actions associated with the hot spots to images in the presentation data. The method also includes receiving, by the computer system, an indication of a clickable hot spot on a first one of the images and associated actions from a user via the second interface. The clickable hot spot includes a data entry field. The method also includes receiving, by the computer system, an indication of a location a data entry display on a second one of the images in response to user input. The method also includes associating, by the computer system, the data entry display with the data entry field such that data entered into the data entry field will also be displayed in the data entry display on the second one of the images.

Yet another illustrative embodiment provides a computer for creating a product training or product demonstration presentation. The computer includes a processor and a non-transitory computer readable storage medium storing program code which, when executed by the processor, performs a computer-implemented method for creating a product training or product demonstration presentation. The program code includes coded instructions for providing a first interface for uploading presentation data to a server. The program code includes coded instructions for receiving presentation data. The program code includes coded instructions for providing a second interface for assigning hot spots and actions associated with the hot spots to images in the presentation data. The program code includes coded instructions for receiving an indication of a clickable hot spot on a first one of the images and associated actions from a user via the second interface. The clickable hotspot includes a data entry field. The program code includes coded instructions for receiving an indication of a location a data entry display on a second one of the images in response to user input. The program code includes coded instructions for associating the data entry display with the data entry field such that data entered into the data entry field will also be displayed in the data entry display on the second one of the images.

Another illustrative embodiment provides a method for tracking usage of demonstration software. The method includes creating, by a server computer, a demonstration. The demonstration includes a plurality of scenes illustrating usage of a software product. The demonstration further includes a tracker. The tracker is configured to monitor selected events and record occurrence of the selected events to a local storage on the user device. The selected events include tracking data indicative of how the demonstration is used by a user. The method further includes providing, by the server computer, the demonstration to a user device. The method further includes receiving, by the server computer, the tracking data from the user device.

Yet another illustrative embodiment provides a computer for tracking usage of demonstration software. The computer includes a processor and a non-transitory computer readable storage medium storing program code which, when executed by the processor, performs a computer-implemented method for creating a product training or product demonstration presentation. The program code includes instructions for creating a demonstration. The demonstration includes a plurality of scenes illustrating usage of a software product. The demonstration further includes a tracker. The tracker is configured to monitor selected events and record occurrence of the selected events to a local storage on the user device. The selected events include tracking data indicative of how the demonstration is used by a user. The program code further includes instructions for providing the demonstration to a user device. The program code further includes instructions for receiving the tracking data from the user device.

Another illustrative embodiment provides a computer program product for tracking usage of demonstration software. The computer program product includes a non-transitory computer readable storage medium having program instructions embodied therewith. The program instructions are executable by a computer to cause the computer to perform a method. The method includes creating a demonstration comprising a plurality of scenes illustrating usage of a software product. The demonstration further includes a tracker. The tracker is configured to monitor selected events and record occurrence of the selected events to a local storage on the user device. The selected events include tracking data indicative of how the demonstration is used by a user. The method further includes providing the demonstration to a user device. The method further includes receiving the tracking data from the user device.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that many users of product training and demonstration programs are not savvy computer programmers. The illustrative embodiments recognize and take into account that non-computer software sophisticated users need a method to create product training and/or demonstration presentations. The illustrative embodiments further recognize and take into account that it is desirable to have a tool for creation of product training and/or demonstration presentations that allow users, such as sales people, to create product training and/or demonstration presentations without the need of involving technical personal. The illustrative embodiments also recognize and take into account that it is desirable to provide a tool for entry of persistent data during use of the demonstration presentation such that other fields on other or the same scene in the demonstration are populated with the same persistent data to provide greater realism to the demonstration and applicability to a particular audience. The illustrative embodiments also recognize and take into account that it is desirable to provide a tracking tool that tracks how a demonstration presentation is used in order, for example, to provide developers, sales staff, and/or other individuals with information to improve the presentation development tool, improve the presentation, or otherwise modify the use of the presentation.

Disclosed illustrative embodiments provide a tool to create a field within a presentation for entry of persistent data that will be populated into other fields in the same or other scenes within the demonstration. Disclosed illustrative embodiments provide a tool for tracking how, when, how long, and on what devices/platforms a demonstration presentation is used.

Figure 1:
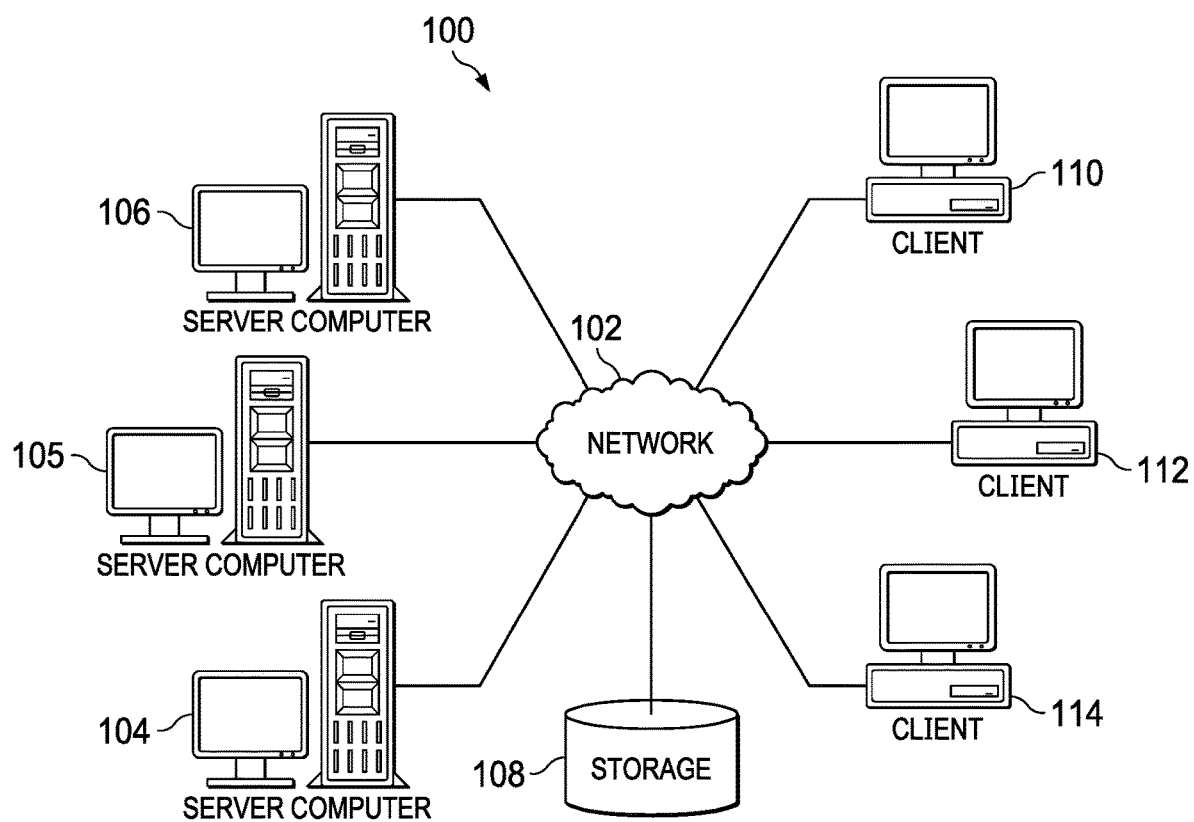
FIG. 1 is an illustration of a block diagram of an information environment in accordance with an illustrative embodiment.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

The computer-readable program instructions may also be loaded onto a computer, a programmable data processing apparatus, or other device to cause a series of operational steps to be performed on the computer, a programmable apparatus, or other device to produce a computer implemented process, such that the instructions which execute on the computer, the programmable apparatus, or the other device implement the functions and/or acts specified in the flowchart and/or block diagram block or blocks.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is a medium used to provide communications links between various devices and computers connected together within network data processing system 100. Network 102 may include connections, such as wire, wireless communication links, or fiber optic cables.

In the depicted example, server computer 104, server computer 105, and server computer 106 connect to network 102 along with storage unit 108. In addition, client computer 110, client computer 112, and client computer 114 connect to network 102. These connections can be wireless or wired connections depending on the implementation. Client computer 110, client computer 112, and client computer 114 may be, for example, personal computers or network computers. In the depicted example, server computer 104, server computer 105, and/or server computer 106 provide information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown. The server computers, client computers and other components shown in this figure are physical hardware devices in the real world.

Program code located in network data processing system 100 may be stored on a computer-recordable storage medium and downloaded to a data processing system or other device for use. For example, the program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used in addition to or in place of client computer 110, client computer 112, and client computer 114 as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
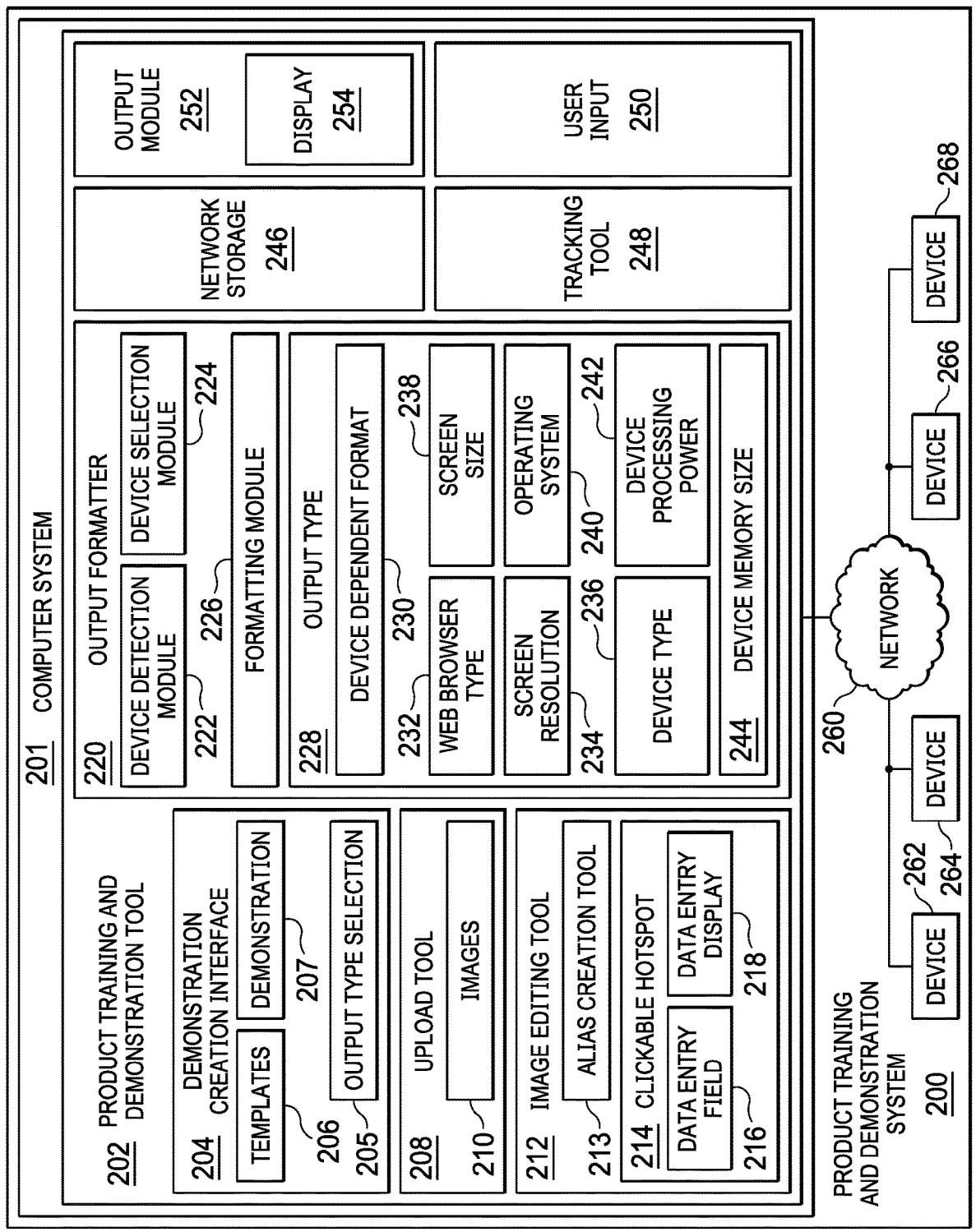
FIG. 2 is a block diagram of a product training and demonstration system in accordance with an illustrative embodiment.

Turning now to FIG. 2, a block diagram of a product training and demonstration system is depicted in accordance with an illustrative embodiment. Product training and demonstration system 200 provides a user, such as a salesperson, with the ability to create customized presentations or demonstrations without the necessity of involving IT professionals, software programmers, or other technical professional. Product training and demonstration system 200 includes a computer system 201 connected to a network 260. Computer system 201 includes a product training and demonstration tool 202. Product training and demonstration system 200 also includes a number of devices 262, 264, 266, 268 connected to product training and demonstration tool 202 through network 260.

Computer system 201 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, an electronic flight bag, a mobile phone, or some other suitable data processing system.

Product training and demonstration tool 202, includes a demonstration creation interface 204, an upload tool 208, an image editing tool 212, an output formatter 220, network storage 246, a tracking tool 248, a user input 250, an output module 252. Demonstration creation interface 204 is configured to create a demonstration 207 responsive to user input 250. Demonstration creation interface 204 includes templates 206 allowing the user to more quickly create a demonstration 207 using prepackaged templates. Demonstration creation interface 204 includes an output type selection 205 that allows the user to select an output type for the demonstration 207. However, typically, the output type will be determined after creation of demonstration 207 and is modifiable depending on the device 262, 264, 266, 268 used and needs of the end user. Demonstration creation interface 204 provides different user interface displays to the user depending on the action the user wishes to take. Examples of various user interfaces are shown in FIGS. 3-15 and described below.

Figure 6:
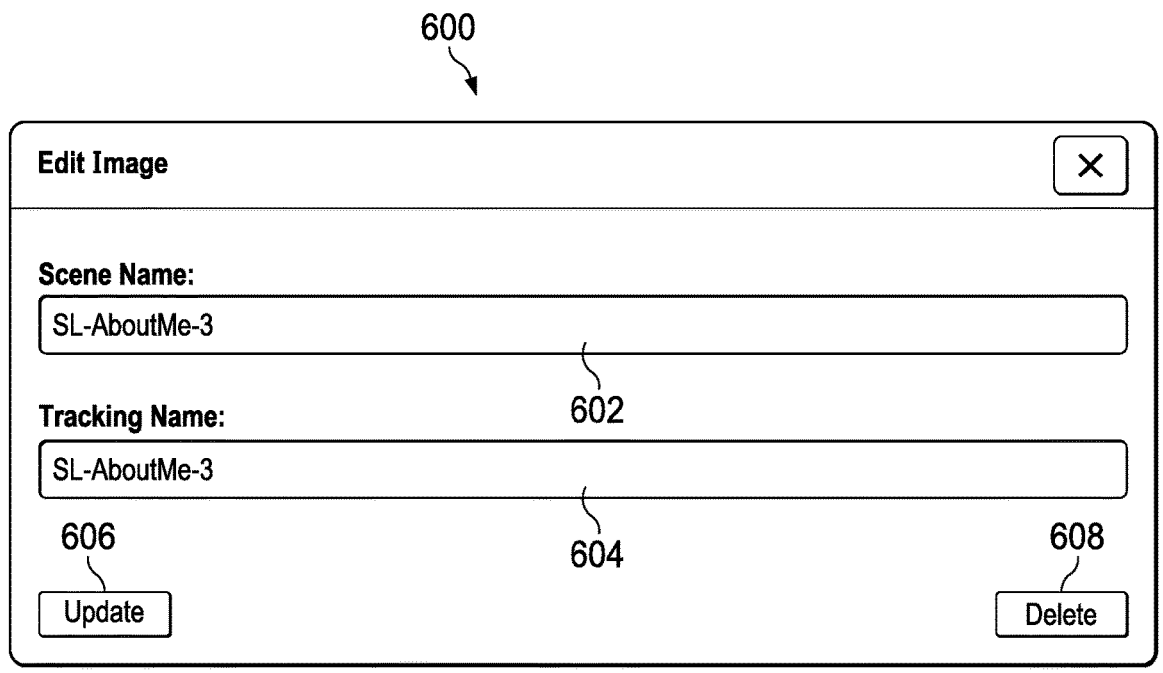

Upload tool 208 allows the user to upload a plurality of images 210 to demonstration 207 being created by the user. Images 210 may be images obtained by the user from executing a product to be demonstrated. Images 210 may be screen shots of various aspects of the product to be demonstrated. Image editing tool 212 includes an alias creation tool 213 that is configured to assign a human readable name to each screen shot or image uploaded by the user in response to user input providing the human readable name or alias. Thus, a user can assign common names to the presentation images (e.g., screenshots). An example of a screenshot is shown in FIG. 6 and described in more detail below. This allows product training and demonstration tool 202 to report the screens accessed in human readable context. Image editing tool 212 is also configured to create clickable hotspot 214 or active region on a first one of images 210 in response to user input 250. Clickable hotspot 214 can create any number of features. Clickable hotspot 214 may be a navigation tool to take the user to another screen in the demonstration. Clickable hotspot 214 may be a dynamic data field, or a hover field to display new information when the user causes a pointer or cursor to hover over a location. Clickable hotspot 214 may create a data entry field, which can, itself, be addressed so other fields can display its contents. When clickable hotspot 214 is used to create a data entry field with data that will be dynamically generated during execution of the presentation and which data will be used to populate other fields on other scenes in the demonstration, this data is referred to as persistent data. Additional details regarding persistent data is provided below with reference to FIGS. 17-21. Clickable hotspot 214 can also create an area of obfuscation, to pixelate any Personally Identifiable Information (PII) on the captured page. Image editing tool 212 is also configured to create data entry field 216 for some of clickable hotspots 214 in response to user input 250. Data entry field 216 is configured to receive user text input when demonstration 207 is being executed. Image editing tool 212 is also configured to create a data entry display 218 on a second one of images 210 in response to user input 250. Thus, in an embodiment, first clickable hotspot 214 includes data entry field 216, wherein data entry display 218 is configured to populate display 254 with data entered into data entry field 216 such that when the user is navigating through demonstration 207, data entered into data entry field 216 will also be displayed in data entry display 218. Thus, the user is able to create a data field with fillable data that, when the data is filled with persist and show up on other images within the presentation. This has the effect of making the presentation appear to work just as the program being demonstrated functions as well as allows the user using the demonstration to use data that is specific and relevant for the audience and the time.

Network storage 246 stores demonstration data (i.e., demonstration data source) making the demonstration editable by multiple users from different locations. The demonstration data source includes multiple fields that include a name and (optionally) data. If there is no initial data, the field is considered null. In an embodiment, these fields include groups that are meant to provide data to run the demonstration and the demonstration output. In an embodiment, fields include the data that holds the demonstration version as well as data that describes each image and the data that binds to a demonstration image field or label for display. When the demonstration is generated, most of this data is considered static in that it will not change. However, the persistent data fields are considered dynamic in that they will most likely change in the demonstration as a user executes the demonstration and enters data into a data field contained in the demonstration. This data may persist on other images or scenes as the user proceeds through the scenes in the demonstration. Thus, by having data that is enterable during execution of the demonstration and that persists on other images or scenes as the user proceeds through the demonstration, the a more realistic visualization of the product is presented to the audience by the demonstration by mimicking the actions of the actual product being demonstrated. This also allows the user of the demonstration to customize the demonstration to an audience by entering data that is appropriate for the particular audience and that is relevant for the particular time that the demonstration is used.

Output formatter 220 is configured to format the demonstration in a device dependent format 230. Device dependent format 230 is suitable for the device 262, 264, 266, 268 with which a user will execute the demonstration 207. Output formatter 220 includes a device detection module 222, a device selection module 224, and a formatting module 226. Formatting module 226 formats the output type 228 of demonstration 207 into a device dependent format 230. Device detection module 222 may be configured to auto detect the type of device 262, 264, 266, 268 the user is using, thereby allowing output formatter 220 to format output type 228 into a device dependent format 230 appropriate for the user's device 262, 264, 266, 268 using formatting module 226. Device selection module 224 allows the user to select the type of device or output format that the user would prefer. Output type 228 may be customized such that the format of the demonstration 207 accommodates a web browser type 232, a screen resolution 234, a device type 236, a screen size 238, an operating system 240, a device processing power 242 or device processing capability, and/or device memory size 244. Many of these features and limitations of the device and the appropriate format for demonstration 207 may be determined based simply on device type 236 and/or web browser type 232.

Tracking tool 248 monitors how the demonstration is used. For example, in an embodiment, the tracking tool monitors how often a page in demonstration 207 is selected. In an embodiment, tracking tool 248 monitors which clickable hotspots 214 are selected and how often. In an embodiment, tracking tool 248 monitors how demonstration 207 is used by different users and/or organizations. In an embodiment, tracking tool 248 monitors how the demonstration is used for different audiences. The data collected by tracking tool 248 may be provided to various different individuals for different purposes. For example, the data collected by tracking tool 248 may be used to modify demonstration 207. The data collected by tracking tool 248 may be used by a software development team to modify a product for which demonstration 207 is used to market or train individuals on using the product. The data collected by tracking tool 248 may even be utilized by the organization to improve or modify the product training and demonstration tool 202 itself. Additional details regarding the tracking tool are provided below with reference to FIGS. 22-23.

Output module 252 provides an interface to provide demonstration 207 to a device 262, 264, 266, 268 via network 260. User input 250 provides an interface allowing the user to input various items into product training and demonstration tool 202 from a device 262, 264, 266, 268 via network 260. Devices 262 264, 266, 268 may be tablet computers, laptop computers, desktop computers, smart phones, or any other device capable of presenting images and/or audio to a user. Demonstration 207 output from product training and demonstration tool 202 may be streamed to device 262 264, 266, 268 via network 260 or may be downloaded to device 262 264, 266, 268 for execution at a later date.

Figure 3:
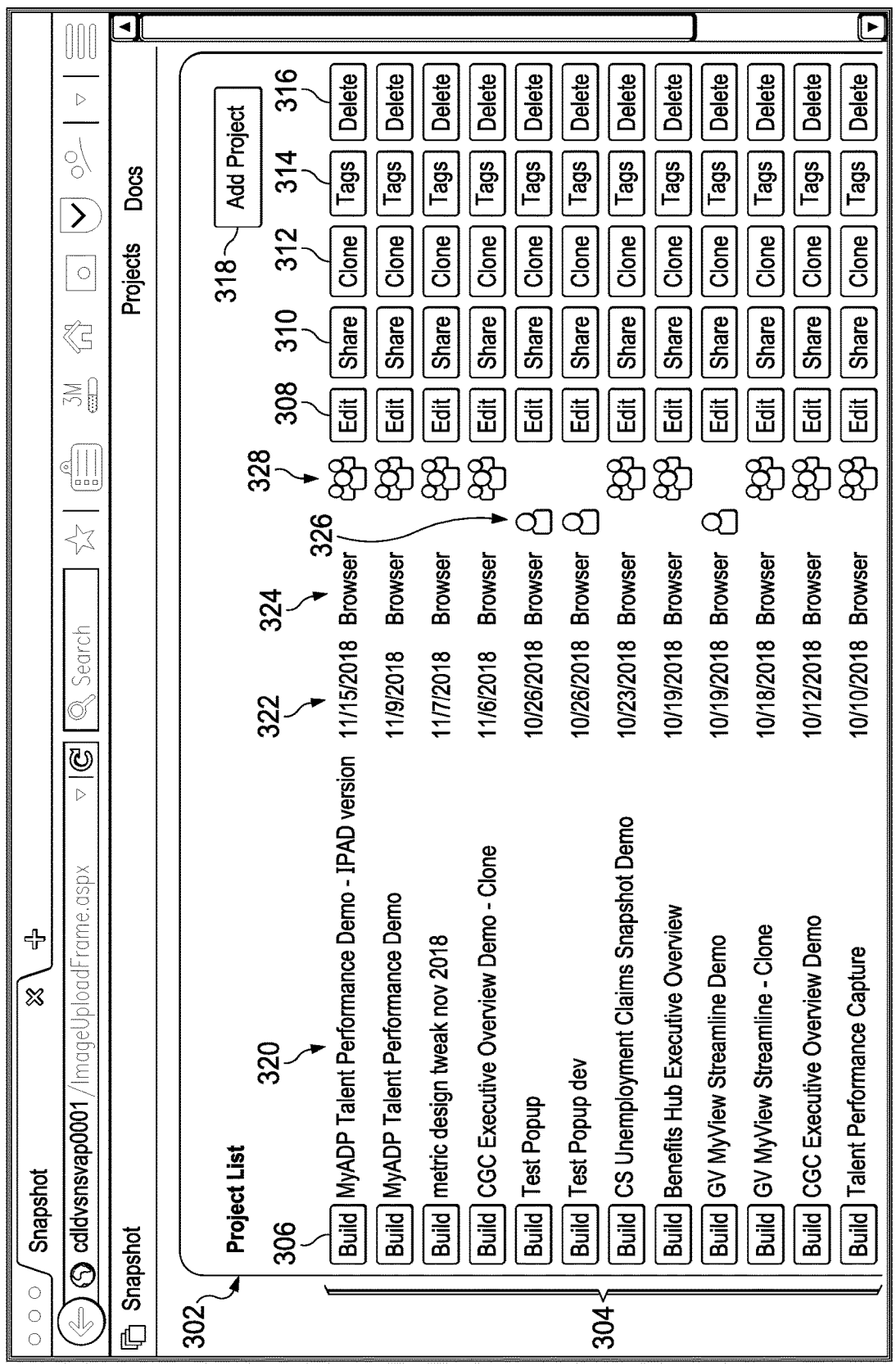
FIGS. 3-15 are diagrams of product training and demonstration user interfaces in accordance with illustrative embodiments.

Turning now to FIG. 3, a diagram of a product training and demonstration user interface is depicted in accordance with an illustrative embodiment. User interface 300 is an example of a demonstration creation interface 204 depicted in FIG. 2. User interface 300 provides a project list 302 to a user to select from. Project list 302 includes a listing of projects 304 with user selectable options of build 306, edit 308, share 310, clone 312, tags 314, and delete 316. User interface 300 also provides icons 326 and 328. Icon 326 indicates that the user is the owner of the project 320 next to the icon 326. Icon 328 indicates that the project 320 next to the icon 328 has been shared with the user by the owner. Indicator 322 next to a project name 320 indicates the type of demonstration. The type of demonstration may be, for example, browser (as shown in FIG. 3), table computer, or smartphone. A project 304 may be implemented as a demonstration 207 depicted in FIG. 2. The project list 302 includes a name 320 of each of the projects 304. The project list 302 also includes a date 322 of creation or last edit of a project 304. A user can edit a project 304 by selecting edit 308 next to the corresponding project 304. A user can also share the project 304 with other users by selecting share 310.

Rather than beginning a project from scratch, a user can choose to clone an existing project 304 that closely matches features that the user desires in a demonstration by selecting clone 312. A user can delete a project 304 by selecting delete 316. A user can add a project by selecting add project 318.

Figure 4:
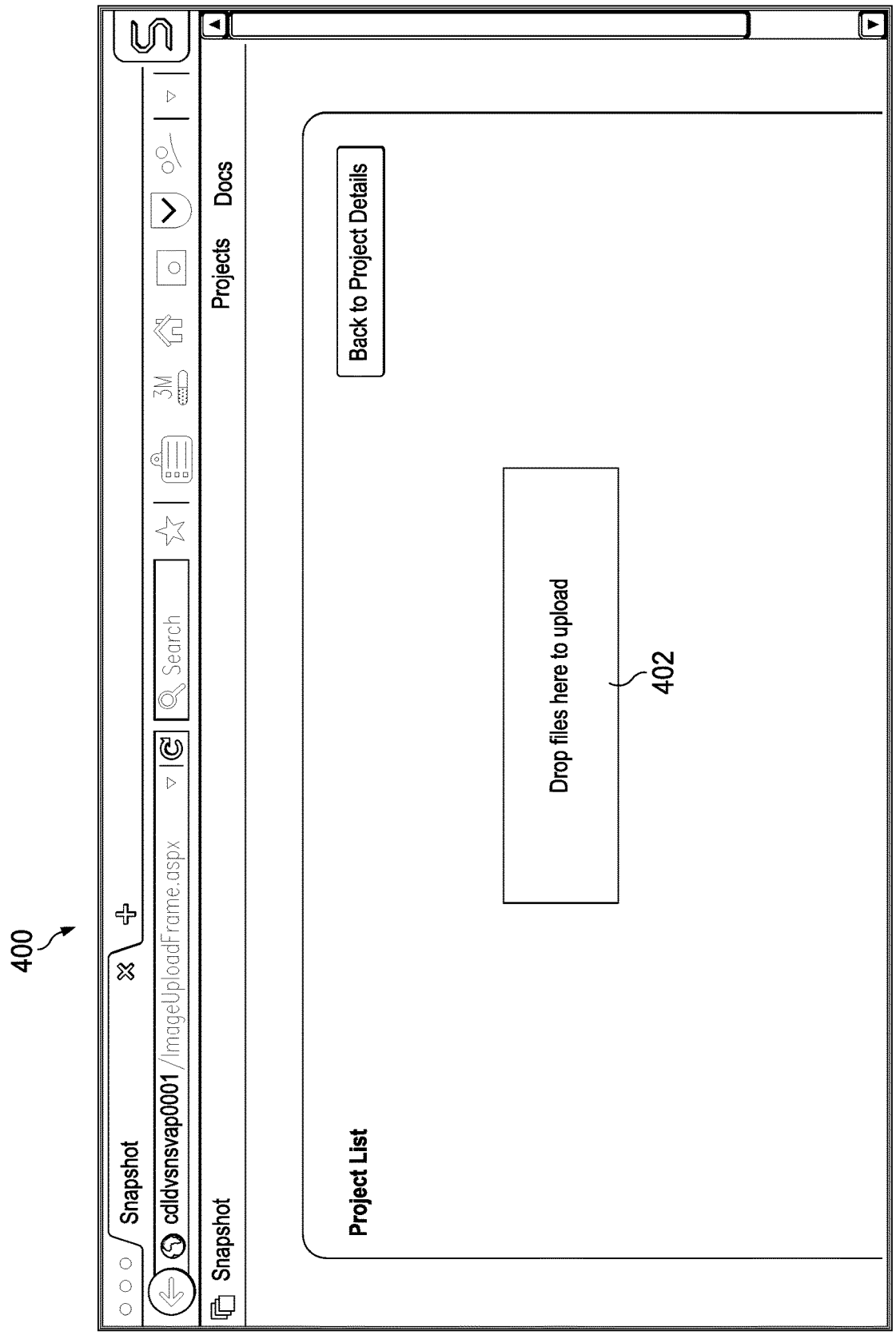

Turning now to FIG. 4, a diagram of a product training and demonstration user interface is depicted in accordance with an illustrative embodiment. User interface 400 is an example of an upload tool interface that can be implemented as part of upload tool 208. User interface 400 includes an area 402 allowing a user to drag and drop a file to be uploaded to a project.

Figure 5:
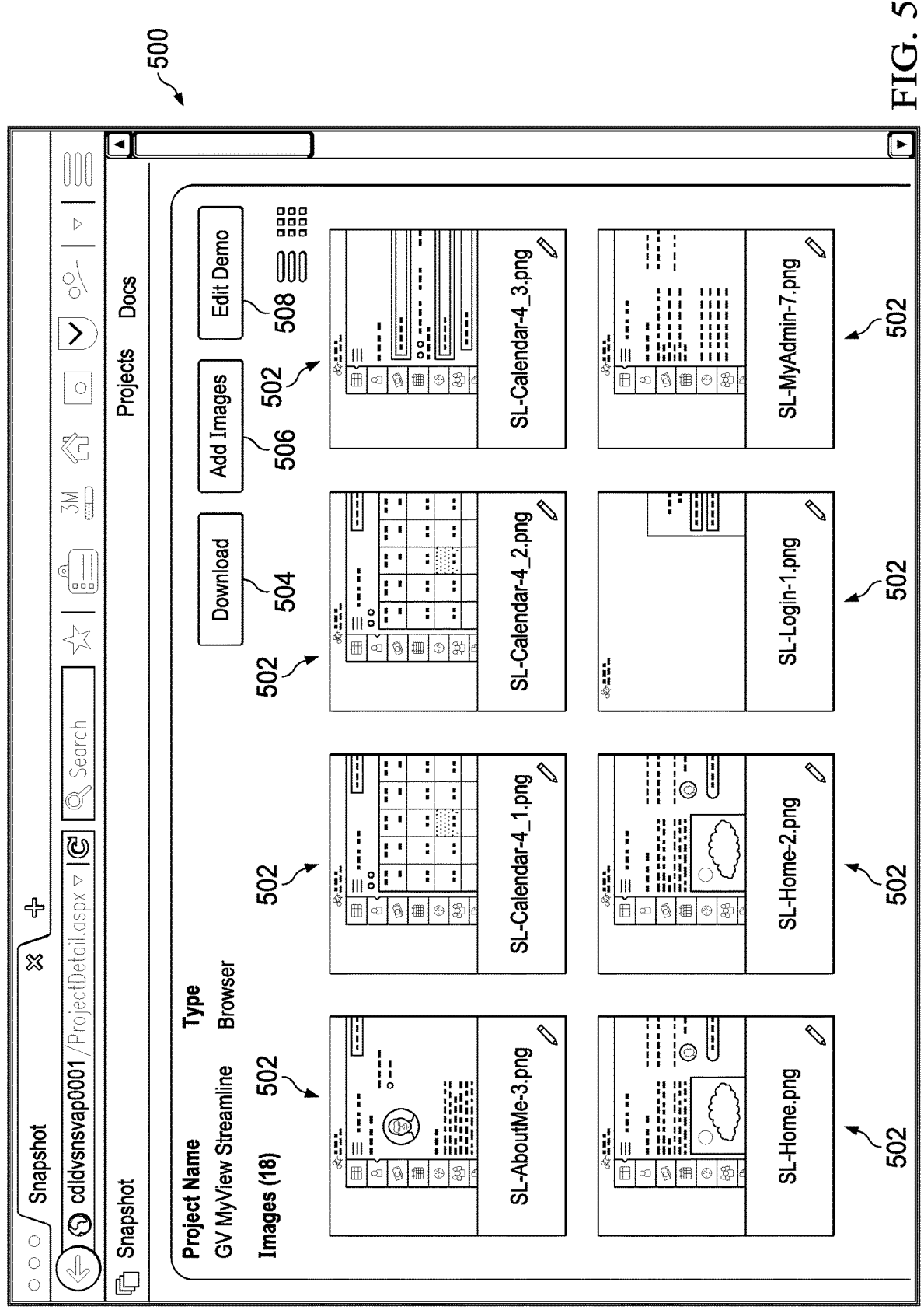

Turning now to FIG. 5, a diagram of a product training and demonstration user interface is depicted in accordance with an illustrative embodiment. User interface 500 shows images 502 hat have been uploaded to a project, such as project 304 in FIG. 3. User interface 500 includes selections for download 504, add images 506, and edit demo 508. The selection for download 504 allows the project images and documents to be downloaded to a user device. Add images 506 selection allows the user to add images to the project. Edit demo 508 allows the user to edit the images or other aspects of the project.

Turning now to FIG. 6, a diagram of a product training and demonstration user interface is depicted in accordance with an illustrative embodiment. User interface 600 may be presented to the user when edit demo 508 is selected from user interface 500 in FIG. 5. User interface 600 allows the user to edit a scene name 602 and a tracking name 604. User interface 600 also allows the user to save the edit by selecting update 606 or to delete the image by selecting delete 608.

Figure 7:
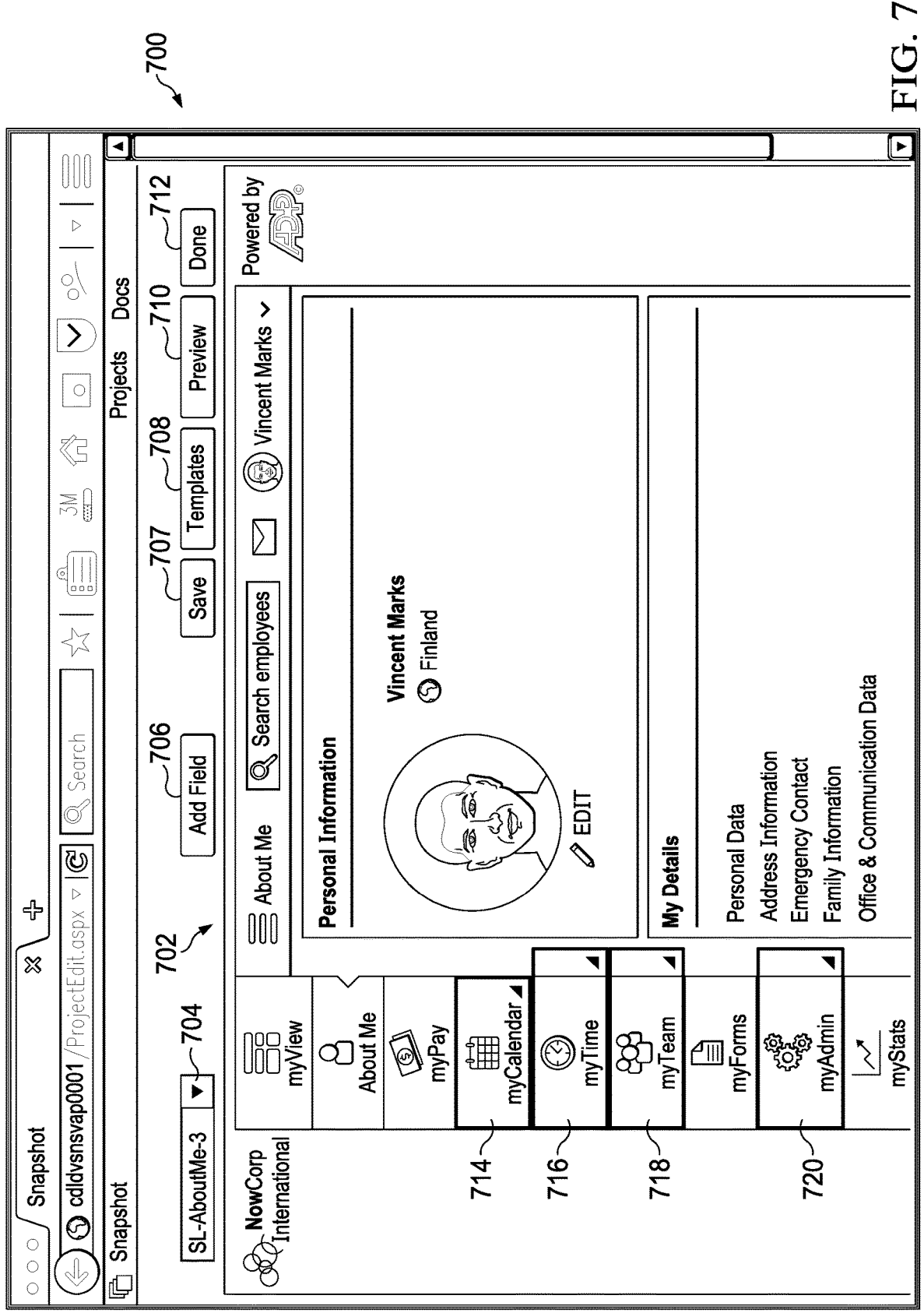

Turning now to FIG. 7, a diagram of a product training and demonstration user interface is depicted in accordance with an illustrative embodiment. User interface 700 is an example of another interface for editing an image for an image in a project 504 selected from a list available in pull-down box 704. User interface 700 provides a screen image 702 of an image of the project, a pull-down box 704 allowing the user to select the image to be edited, an add field 706 option, a save 707 option allowing the user to save changes, a template 708 selection, a preview 710 selection, and a done 712 selection. The user can add an active region 714, 716, 718, 720 to the screen image 702. Active region 714, 716, 718, 720 can be defined by the user such that a specific action by the user results in a corresponding action on the demonstration. For example, hovering over an active region 714, 716, 718, 720 with a user's cursor or pointer may bring a pop-up image over the area. As another example, selecting an active region 714, 716, 718, 720 may cause the demonstration to go to a different screen and the particular screen that the demonstration advances to depends on which active region 714, 716, 718, 720 the user selects. Add field 706 allows a user to add text boxes and labels to the screen image 702. The active regions 714, 716, 718, 720 (e.g., hotlinks) may be created, for example, with a click-drag-click user action. Template 708 allows the user to create template elements by name so that, for example, individual links, such as active regions 714, 716, 718, 720, can be added to the named template for use elsewhere. to apply to the screen image 702 rather than the user having to manually enter all of the desired active region. Preview 710 allows the user to preview how the screen image 702 will look and react to user input when executed as part of a project. Selecting done 712 saves the user's changes and returns the user to a main screen such as, for example, user interface 300.

Figure 8:
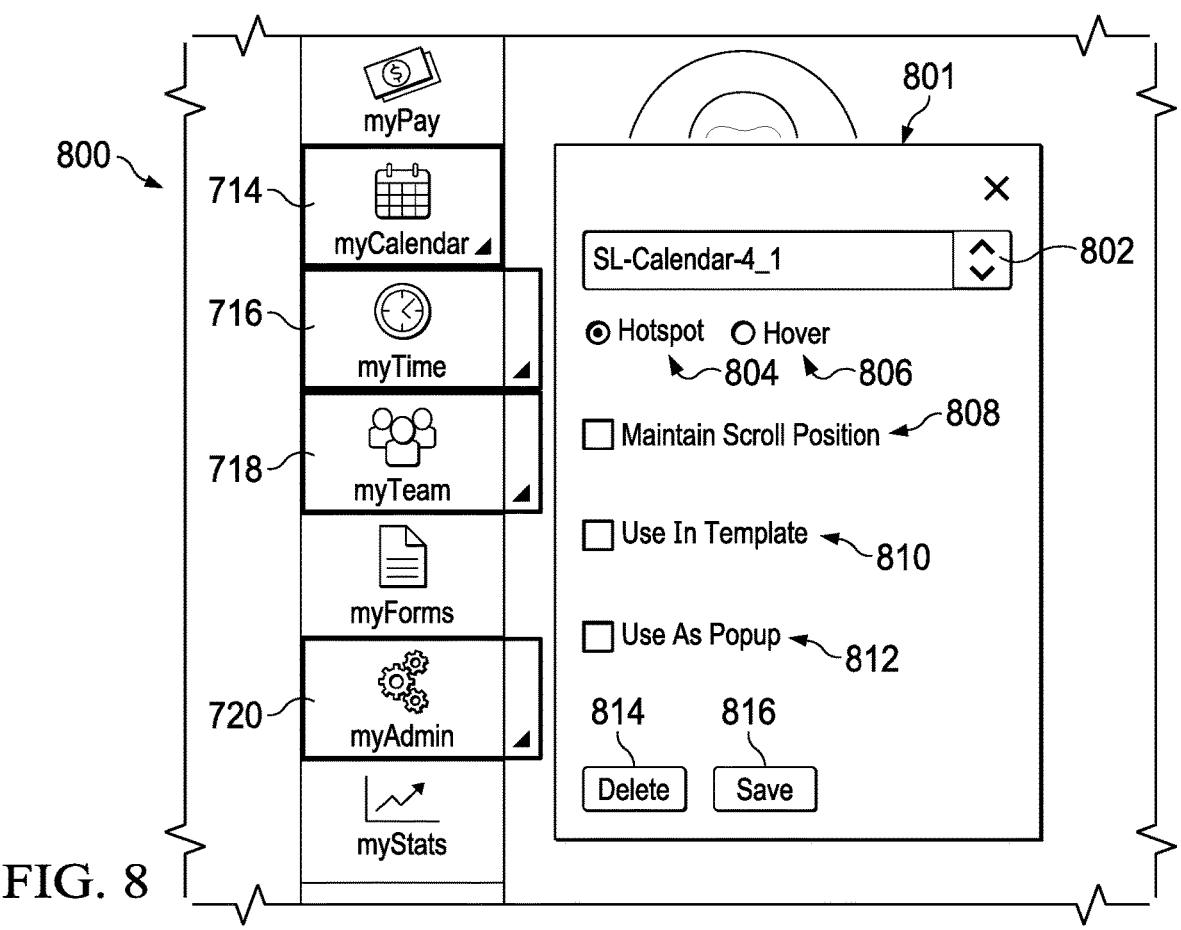

Turning now to FIG. 8, a diagram of a product training and demonstration user interface is depicted in accordance with an illustrative embodiment. User interface 800 is an example of a portion of user interface 700 after the user has selected one of active regions 714, 716, 718, 720 for editing. Model dialog box 801 is provided to the user. Model dialog box 801 provides the user with various options for defining the function of an active region 714, 716, 718, 720. The options may include a drop-down menu 802 for selecting which screen that selection of a selected active regions 714, 716, 718, 720 will send the user to. The options may also include a selection for hotspot 804, a selection for hover 806, a selection for maintain scroll position 808, a selection for use in template 810 which is where the template created in template 708 can be selected, and a selection for use as a popup 812. If hotspot 804 is selected, the active region 714, 716, 718, 720 becomes a clickable spot wherein clicking on the active region 714, 716, 718, 720 causes a user specified response. If hover 806 is selected, then an action occurs when a user hovers over the active region 714, 716, 718, 720 with their cursor or pointer. Use as a template 810 allows the user to save their active region 714, 716, 718, 720 selections to use for other screens within the current projects. The user also has the option to delete 814 or save 816 their edits.

Figure 9:
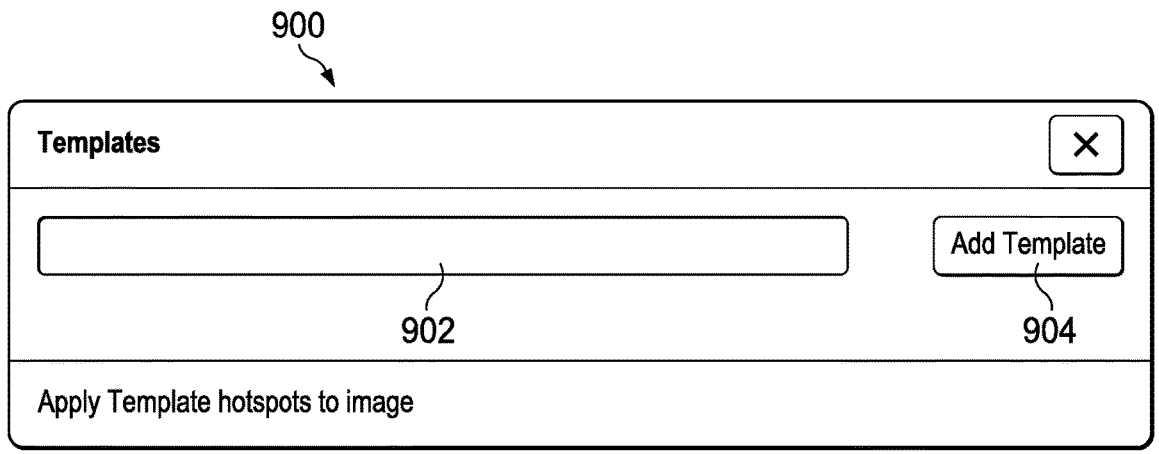

Turning now to FIG. 9, a diagram of a product training and demonstration user interface is depicted in accordance with an illustrative embodiment. User interface 900 allows a user to create a template of hotspots or active regions by entering a template name in box 902 and selecting add template 904 to have the hotspot preferences for the selected template added to the image. The user then selects a template in each hotspot to be included in that template 904.

Figure 10:
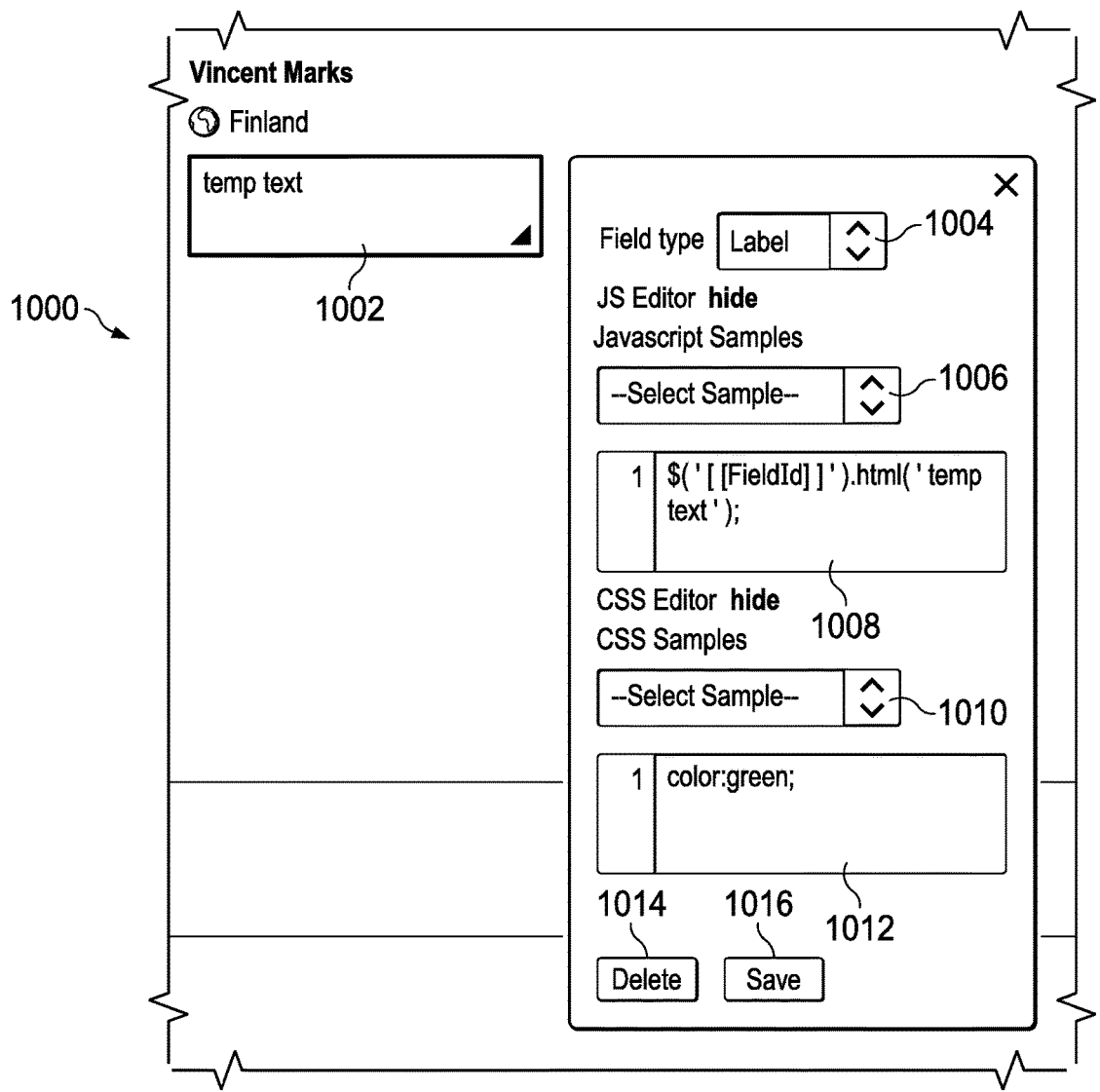

Turning now to FIG. 10, a diagram of a product training and demonstration user interface is depicted in accordance with an illustrative embodiment. User interface 1000 allows the user to modify or edit the function of an active region such as the fields created with add field 706. The field could then be populated with dynamic data such as a date, or be linked to a text field to display the content as part of the data persistence feature. The user may add template text to a text box 1002 and modify Java script and cascading style sheets (CSS) commands in fields 1008, 1012. The user may select the field type from drop down menu 1004 and select JavaScript samples from drop down menu 1006. The user may select CSS samples from drop down menu 1010. Thus, even user's that are unfamiliar with JavaScript or CSS may implement functionality by merely selecting an appropriate menu option from the drop-down menus 1006, 1010. However, more sophisticated users may enter JavaScript and CSS commands directly into fields 1008, 1012 if they so choose. The user may delete or save their work using delete button 1014 or save button 1016, respectively.

Figure 11:
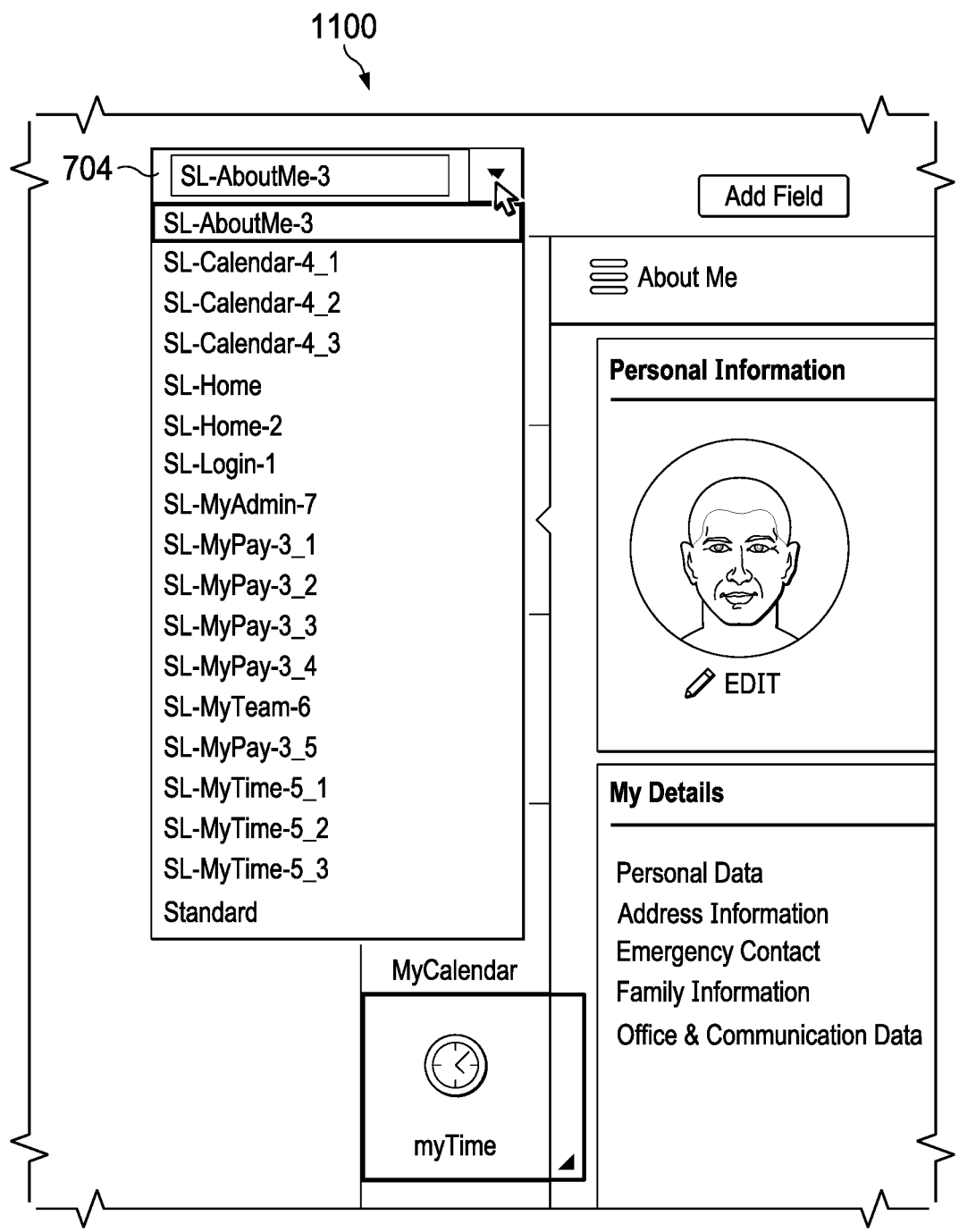

Turning now to FIG. 11, a diagram of a product training and demonstration user interface is depicted in accordance with an illustrative embodiment. User interface 1100 shows a portion of user interface 700 after selection of the drop-down menu 704. Drop down menu 704, when selected, provides a list of images that are part of a project and allows the user to select a different image to edit.

Figure 12:
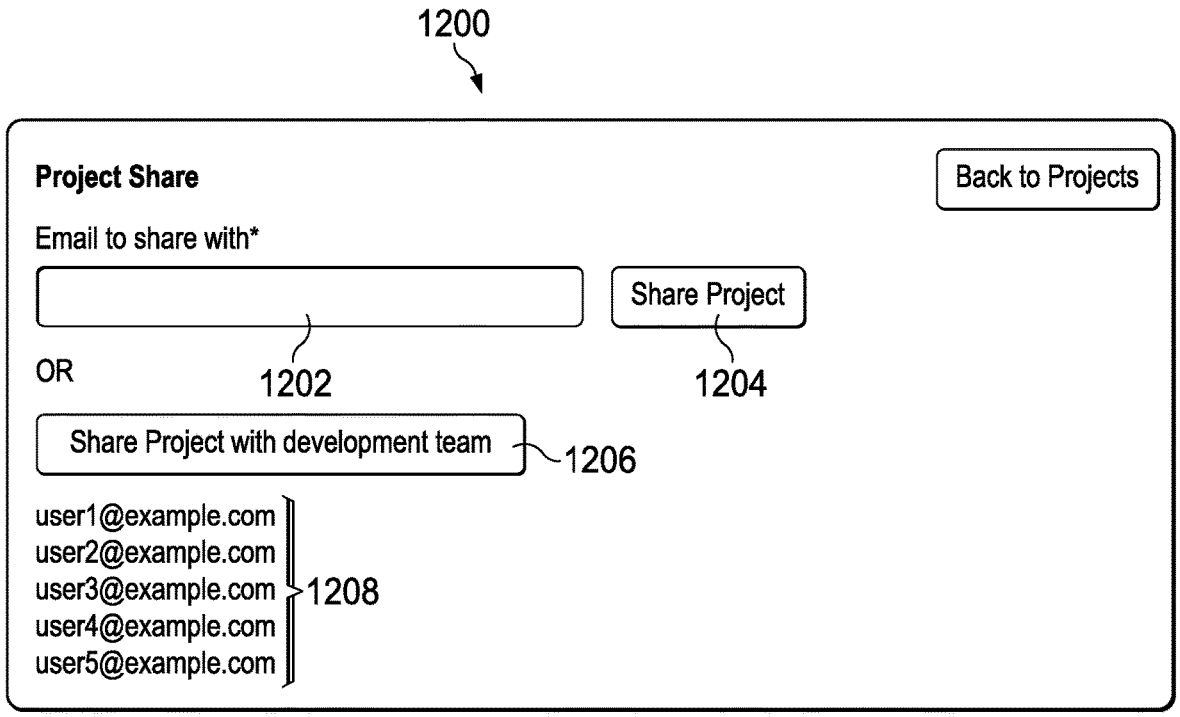

Turning now to FIG. 12, a diagram of a product training and demonstration user interface is depicted in accordance with an illustrative embodiment. User interface 1200 allows a user to share a project with other users. The user may enter the email address into text box 1202 and select share project 1204 to share the project with a user. Alternatively, the user may simply select the option of share project with development team 1206 to share with the development team members listed in list 1208. Each person with whom the user designates to share the project with may edit the project.

Figure 13:
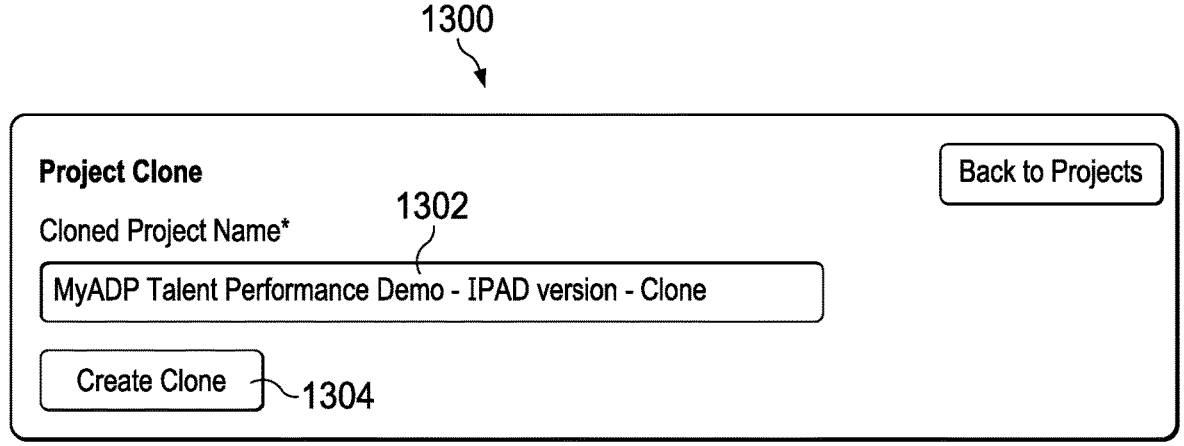

Turning now to FIG. 13, a diagram of a product training and demonstration user interface is depicted in accordance with an illustrative embodiment. User interface 1300 is an example of an interface allowing a user to create a clone of a project by entering a name of a cloned project into text box 1302 and selecting create clone 1304. The name entered into text box 1302 will be the name of a new project created from a clone of a previously created project. This allows a user to create new projects easily without starting from scratch.

Figure 14:
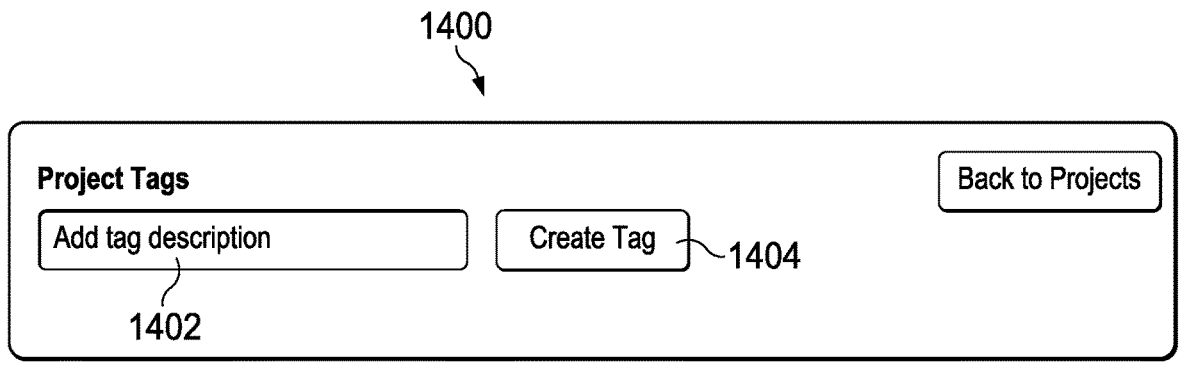

Turning now to FIG. 14, a diagram of a product training and demonstration user interface is depicted in accordance with an illustrative embodiment. User interface 1400 allows a user to add project tags to text box 1402 and selecting create tag 1404 so that the project is easily searched for.

Figure 15:
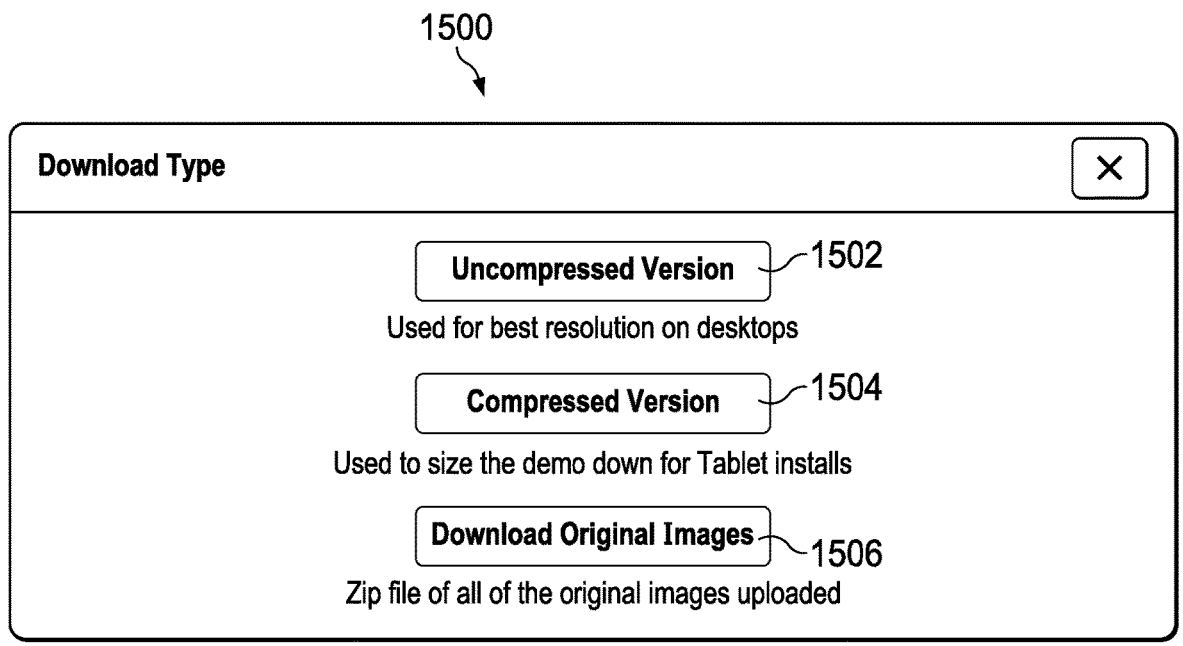

Turning now to FIG. 15, a diagram of a product training and demonstration user interface is depicted in accordance with an illustrative embodiment. User interface 1500 allows a user to select a download type for a completed project. The project may be downloaded to a user device for execution as a demonstration or training presentation. The user interface 1500 allows the user to select the best version for the device that the user will utilize. For example, user interface 1500 includes selections for an uncompressed version 1502 used for best resolution on desktops, a compressed version 1504 used to size the demonstration down for tablet computer installs or other similar type devices, or download original images 1506 that provides a zip file of all of the original images uploaded. This allows a user to download the original images, without the links. In an embodiment, the system is web based, so a user could open from another workstation and download the images for editing, for example.

The various user interfaces 300, 400, 500, 600, 700, 800, 900, 1000, 1100, 1200, 1300, 1400, 1500 are presented as exampled. The various functions and features of each user interfaces 300, 400, 500, 600, 700, 800, 900, 1000, 1100, 1200, 1300, 1400, 1500 may vary depending on implementation. Thus, each user interfaces 300, 400, 500, 600, 700, 800, 900, 1000, 1100, 1200, 1300, 1400, 1500 may include other, different, or fewer features than shown. Additionally, other interfaces other than user interfaces 300, 400, 500, 600, 700, 800, 900, 1000, 1100, 1200, 1300, 1400, 1500 may be used with product training and demonstration tool 202.

Figure 16:
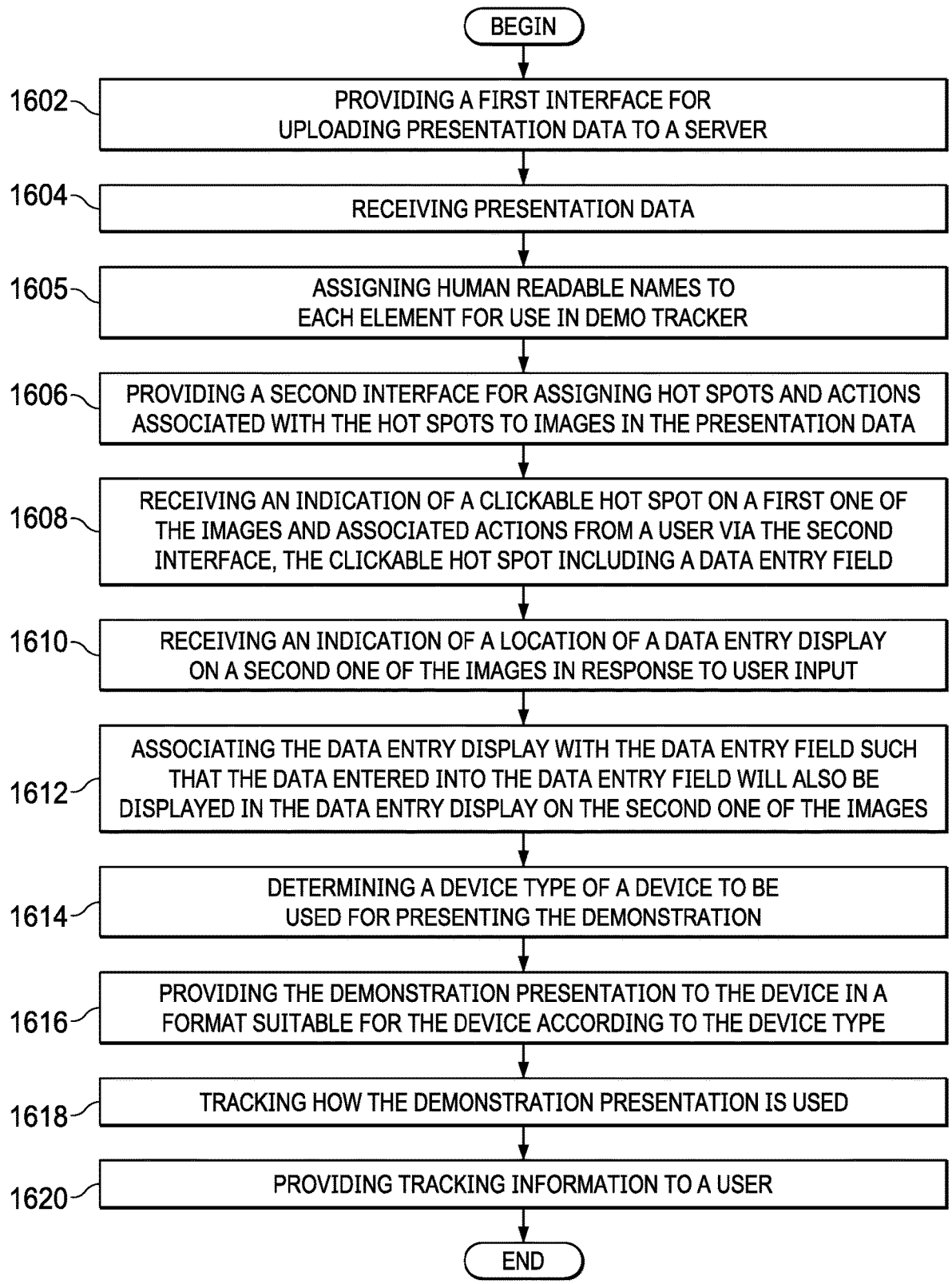
FIG. 16 is a flowchart of a method for creating a product demonstration in accordance with an illustrative embodiment.

Turning now to FIG. 16, a flowchart of a method for creating a product demonstration is depicted in accordance with an illustrative embodiment. Method 1600 begins by providing a first interface for uploading presentation data to a server (step 1602) and receiving presentation data (step 1604). Next, the method 1600 continues by assigning human readable names to each element for use in a demonstration tracker (step 1605). Assigning human readable names may include receipt of user input providing the human readable name for each element (e.g., screen shot or image) in the demonstration. Next, method 1600 continues by providing a second interface for assigning hot spots and actions associated with the hot spots to images in the presentation data (step 1606) and receiving an indication of a clickable hot spot on a first one of the images and associated actions from a user via the second interface, the clickable hot spot including a data entry field (step 1608). Next, method 1600 continues by receiving an indication of a location a data entry display on a second one of the images in response to user input (step 1610) and associating the data entry display with the data entry field such that data entered into the data entry field will also be displayed in the data entry display on the second one of the images (step 1612). Method 1600 continues by determining a device type of a device to be used for presenting the demonstration (step 1614) and providing the demonstration presentation to the device in a format suitable for the device according to the device type (step 1616). In an embodiment, the device type is auto determined or determined according to user input. Next, method 1600 continues by tracking how the demonstration presentation is used (step 1618) providing tracking information to a user (step 1620), after which, method 1600 ends. In an embodiment, the presentation data is editable via a browser by multiple users. The tracking information may be used to further modify the presentation by eliminating screens that are seldom used. The tracking information may also be used to further develop product features by tracking which kinds of features seem to be used most. In various embodiments, one or more steps in FIG. 16 may be optional.

Turning now to a more detailed description of persistent data, within the demonstration, in an illustrative embodiment, there is a memory space dedicated to the demonstration data source. This data source has multiple fields that include, for example, a name and data. If there is no initial data, the field is considered null.

These fields for the persistent data include groups that are meant to provide data to run the demonstration and the demonstration output. These fields may be, for example, data that holds the demonstration version as well as the data that describes each image and data that binds to a demonstration image field or label for display.

When the demonstration is generated, most of this data is considered static in that it will not change, but the persistent data fields are considered dynamic in that they will most likely change in the demonstration as a user proceeds through the scenes of the demonstration. In an illustrative embodiment, the fields that can be added to a scene include label, text input, select, radio, and checkbox.

Figure 17:
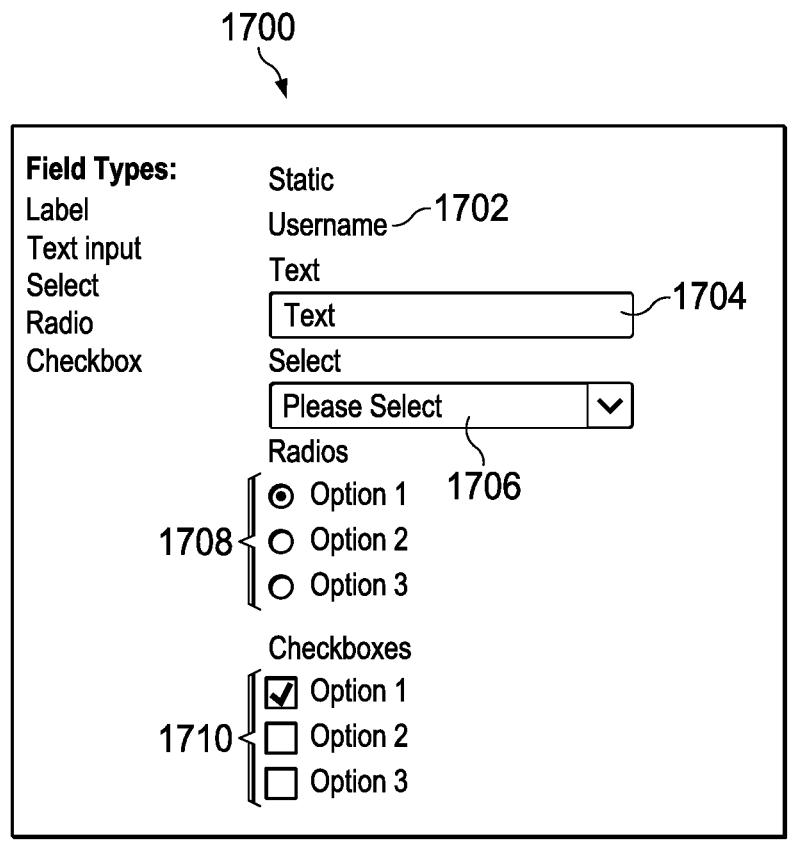
FIG. 17 is a screen showing examples of several fields types as they may look in a scene in accordance with an illustrative embodiment.

FIG. 17 is a screen 1700 showing examples of several fields types as they may look in a scene in accordance with an illustrative embodiment. The screen 1700 includes static labels such as username 1702. The screen 1700 also includes a text input box 1704 and a select input 1706 that provides a drop down menu of options to be selected. The screen 1700 also includes radios 1708 with several options and checkboxes 1710 with several options.

Figure 18:
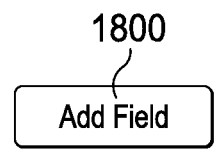
FIG. 18 is an example of an add field button depicted in accordance with an illustrative embodiment.

FIG. 18 is an example of an add field button 1800 depicted in accordance with an illustrative embodiment. In an illustrative embodiment, the fields 1702, 1704, 1706, 1708, 1710 in FIG. 17 are created by clicking add field button 1800 and then configuring the properties via a user interface. User interface 1000 is an example of a user interface that may be used to configured the properties, such as, for example, color, of the fields shown in FIG. 17.

Figure 19:
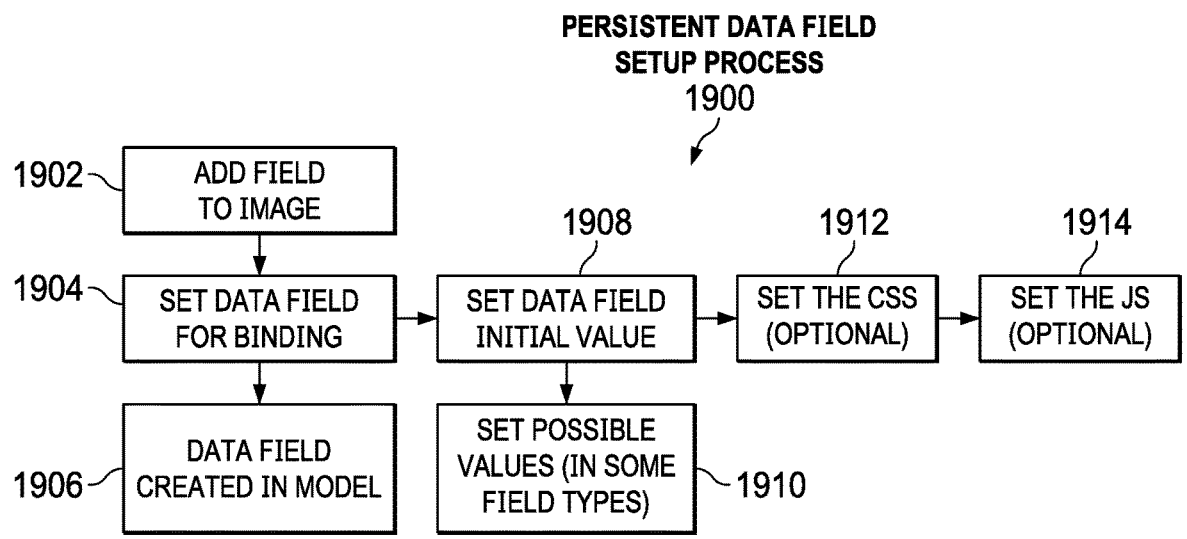
FIG. 19 is a flowchart of a process for configuring a control field in accordance with an illustrative embodiment.

FIG. 19 is a flowchart of a process 1900 for configuring a control field in accordance with an illustrative embodiment. Process 1900 may be used to configure the fields shown in FIG. 17. Process 1900 begins by a user adding fields to an image by, for example, clicking an add field button, such as add field button 1800, in order to add a field holder to a scene within a demonstration (step 1902). Next, data field for binding is set (step 1904) thereby creating a data field in the model (step 1906). Next, the data field is set to an initial value (step 1908) and, for some field types (e.g., select field, such as select 1706) possible values are set (step 1910). Examples of possible data selections for the end user include select drop down values or multiple check box values. Next, the cascading style sheets (CSS) styles are set using, for example, the control shown in FIG. 10 (step 1912). Next, the JavaScript (JS) is set (step 1914), after which, the process 1900 may end. One or more steps in FIG. 19 may be optional and may be omitted in some embodiments.

Figure 20:
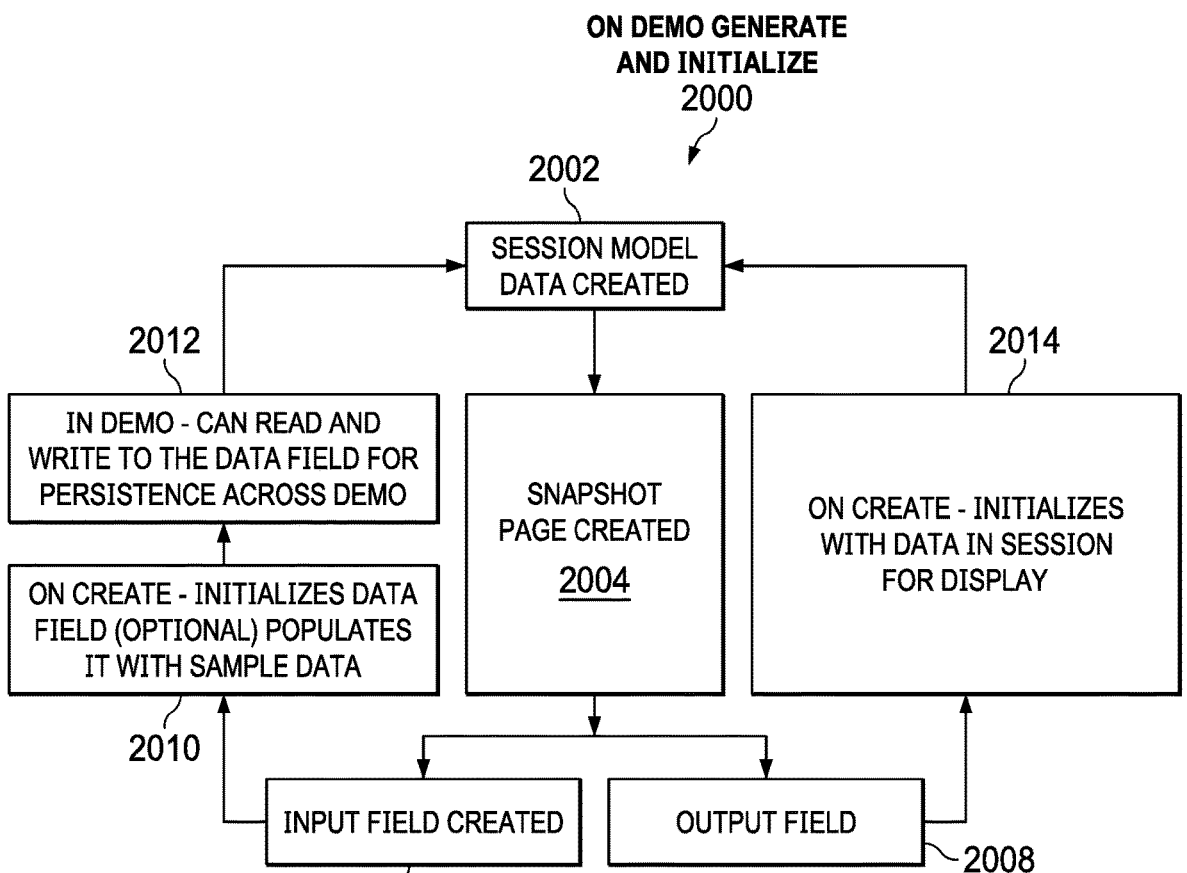
FIG. 20 is a flowchart of a process for reading and writing to persistent data fields depicted in accordance with an illustrative embodiment.

FIG. 20 is a flowchart of a process 2000 for reading and writing to persistent data fields in accordance with an illustrative embodiment. The process beings on demonstration generation and initialization with session model data creation (step 2002). Next, a snapshot page is created (step 2004). In an embodiment, a snapshot page is an image of a screen from a product for which the presentation is being created for product demonstration or training. Next, the input field is created (step 2006) and the output field is created (step 2008). Next, on creation of the input field, the data field is optionally initialized and populated with sample data (step 2010). In the demonstration, this data field can be read from and written to for persistence across the demonstration (step 2012). The output field, on creation, is initialized with data in the session for display (step 2014). The data is cleared upon starting a new demonstration.

Turning now to a detailed discussion of the tracking feature. The tracking feature provides, for example, data feedback regarding how the offline demonstrations are presented in the field—what workflows are being presented, what pages hit, how long each presentation takes, and the devices used to present the demonstration. In an illustrative embodiment, the tracking feature provides an end-to-end, anonymized accumulation of demo use data, collated, and presented in dashboard format.

The demonstration tracking system JavaScript control initializes as part of the demonstration start up process. Once initialized, it can be called to track an event at any point inside the demonstration. Events consist of active changes within the demonstration. One event is the page load which sends a call to the tracking system. As the page loads, the system time is noted, the name of the page, the Globally Unique Identifier (ID) of the device, the device type, and information on the demonstration build are recorded in local memory. If an Internet connection is detected, this information is sent immediately to the tracking server. If an Internet connection is not detected, these event calls are saved to a secure local storage area on the user's computer until an Internet connection is detected.

When the system, such as, for example, client computer 110, senses it has connectivity to the Internet, it opens a port to the demonstration tracking data server, which may be implemented as, for example, server 104, located inside an enterprise network, such as, for example, network 102, and begins the process of uploading the accumulated tracking data in memory. The data is sent to, for example, a structure query language (SQL) 2012 database, but not committed to the database, until the end of data acknowledgement is sent by the device and received by the database, at which time the data is committed to the database and deleted from the user's system. This is designed so that the same data is not sent and collated multiple times.

If the connection is interrupted, the data that has been transferred is rejected at the database side. When the device resumes connectivity, the transfer is retried until the ack is received. Once the acknowledgment is received at the database side, the device local memory store is purged, allowing for new tracking information to be recorded. Should the device not sense an Internet connection for a considerable timeframe, and local memory of the device fills, the oldest data in memory will be overwritten, so that the device does not fail, and the latest demonstration data can be archived.

The tracking system can be toggled on/off in code prior to build and download to the device. This is provided to allow interim builds, quality assurance (QA) test and user acceptance testing (UAT) builds to be released and cycled without impacting the data totals in production. There are also one-off demonstration builds for which, in some embodiments, tracking data may be of little use.

Figure 21:
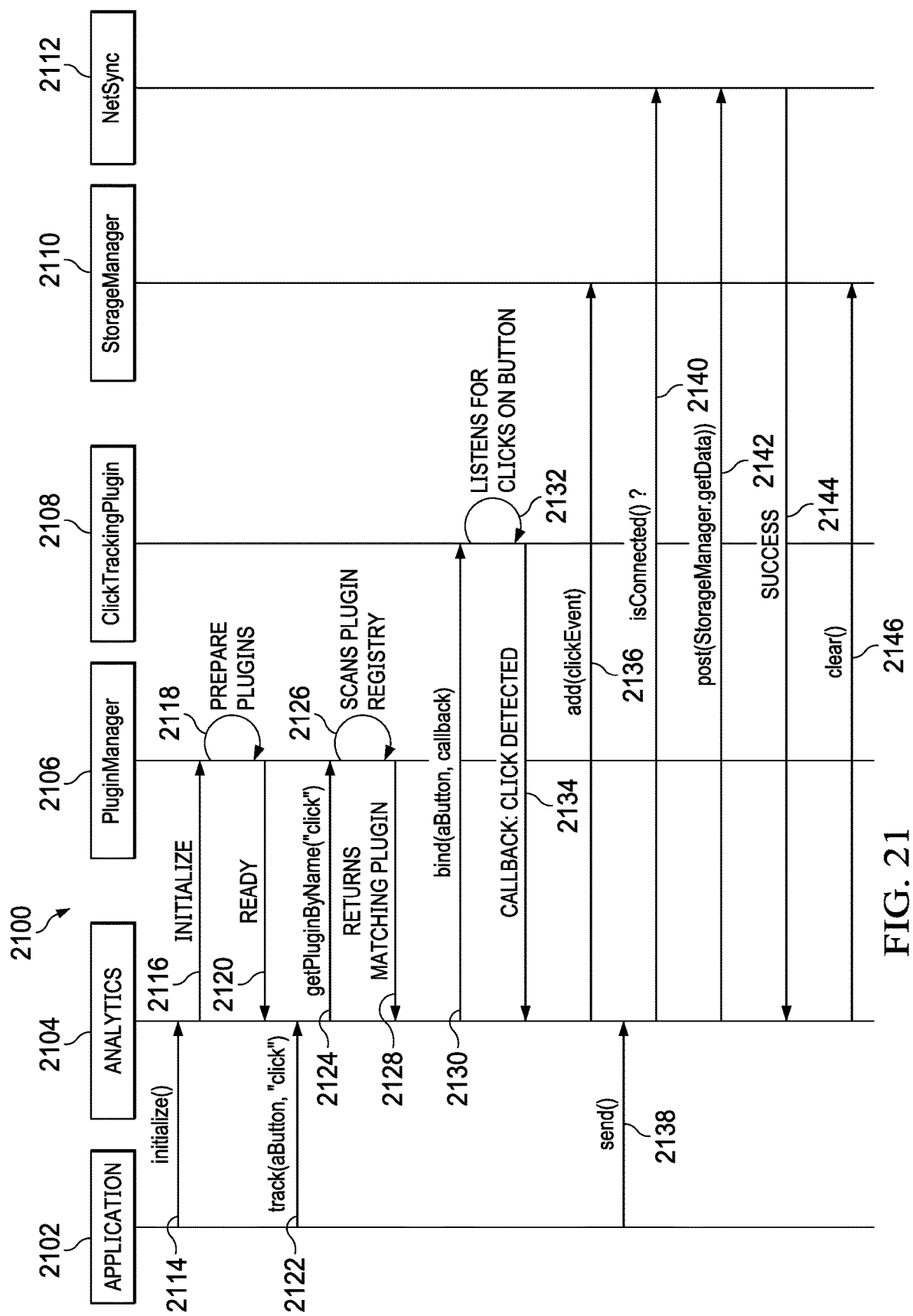
FIG. 21 is a message flow diagram of a process on a user device for tracking usage of a demonstration depicted in accordance with an illustrative embodiment.

Turning now to FIG. 21, a message flow diagram of a process 2100 on a user device for tracking usage of a demonstration is depicted in accordance with an illustrative embodiment. The process 2100 may be executed on a user device and includes messages exchanged between various components within a user device, such as, for example, client computer 110 depicted in FIG. 1. In an illustrative embodiment, the components include an application 2102, an analytics module 2104, a plugin manager 2106, a click tracking plugin 2108, a storage manager, a network synchronizer 2112. The process 2100 begins with the application 2102 sending an initialize message (step 2114) to the analytics module 2104. Next, the analytics module 2104 sends an initialize message (step 2116) to plugin manager 2106. The plugin manager 2106 prepares the plugins (step 2118) and then sends a read message (step 2120) to the analytics module 2104. The application 2102 sends a track a click button message (step 2122) to the analytics module 2104 which then sends a get plugin by name "click" message (step 2124) to the plugin manager 2106. The plugin manager 2106 scans the plugin registry (step 2126) and then returns a matching plugin message (step 2128) to the analytics module 2104.

Once the analytics module 2104 is provided with confirmation that a plugin exists that can perform the requested functionality and is provided with the identity of the click tracking plugin 2108, analytics module 2104 then sends a bind message (step 2130) to the click tracking plugin 2108 which instructs click tracking plugin 2108 to listen for clicks on a specified button (step 2132). When the click tracking plugin 2108 detects a click on the specified button, the click tracking plugin 2108 sends a callback message (step 2134) to the analytics module 2104 indicating that a click was detected. The analytics module 2104 then sends an add click event message (step 2136) to the storage manager 2110 which stores the event.

At some point in time, usually after the user has completed their session, but, in some embodiments, at other times, such as during the performance of a session, the application 2102 transmits a send message to the analytics module 2104 instructing the analytics module to transmit the tracking data from storage manager 2110 to the network synchronizer 2112 for storage, synchronization, and analysis at the network side. At step 2140, the analytics module 2104 sends a connection message to the network synchronizer 2112 to determine if the user device is connected to the server side, e.g., computer system 201 in FIG. 2, of the system 2100. If there is a connection to the server, the analytics module 2104 sends a post message (step 2142) to the network synchronizer, the post message contains that tracking data that has been stored in the storage manager 2110 and requests that the network synchronizer 2112 store the tracking data. If all of the data is transmitted, the network synchronizer 2112 sends a success message (step 2144) to the analytics module 2104. When a success message is received by the analytics module 2104, the analytics module sends a clear data message (step 2146) to the storage manager 2110 instructing the storage manager 2110 to clear the data from the storage such that data from other sessions or further data from a continuing session may be stored.

Figure 22:
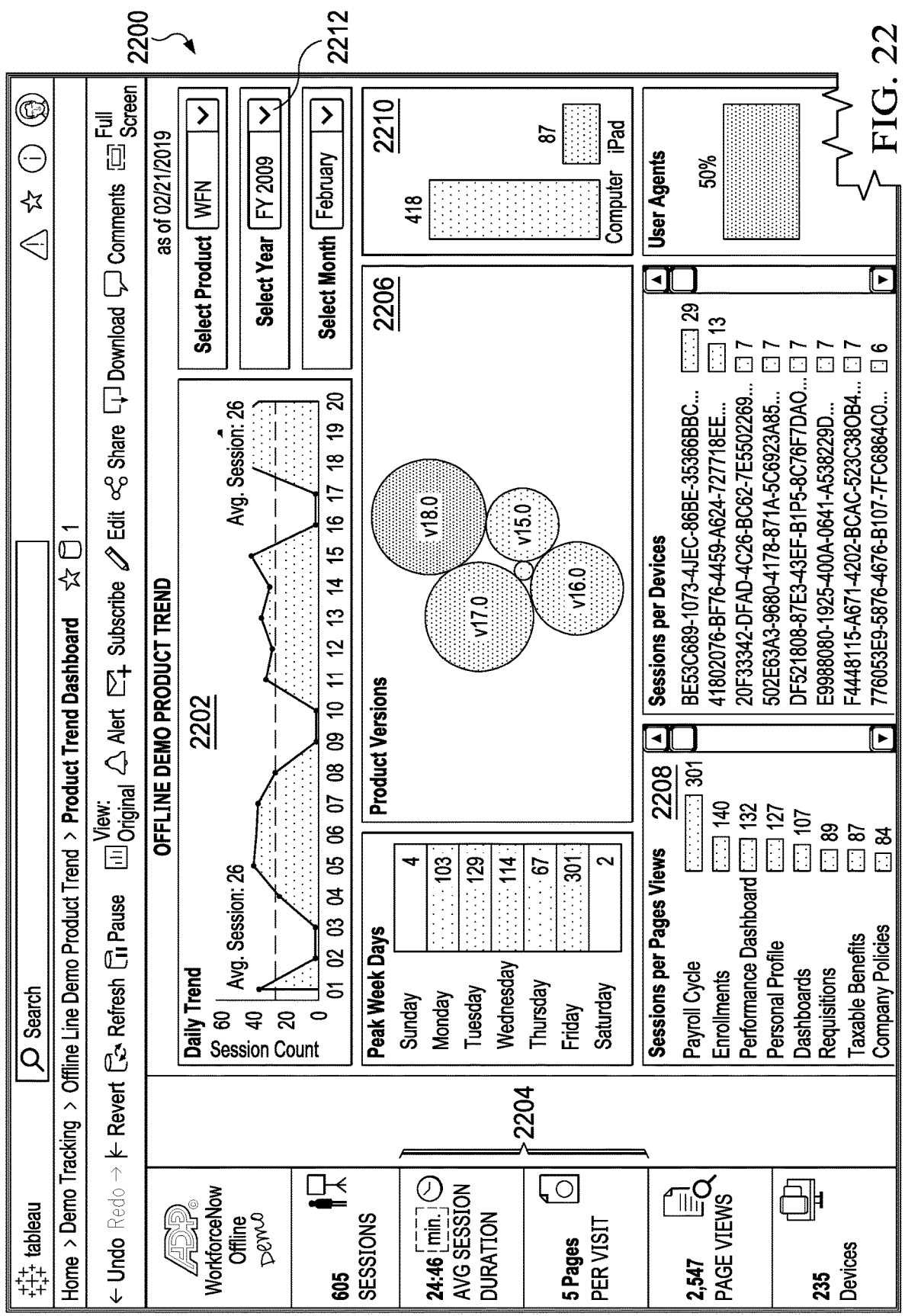
FIG. 22 is a user interface for providing tracking data to a user depicted in accordance with an illustrative embodiment.

Turning now to FIG. 22, a user interface for providing tracking data to a user is depicted in accordance with an illustrative embodiment. User interface 2200 includes a daily sessions chart 2202, an average metrics time and depth per session indicator 2204, a product versions demoed section 2206, a most demoed pages section 2208, and a devices used section 2210. The user interface 2200 also provides the user with selection options such as a select activity period drop down menu 2212. In an illustrative embodiment, the user interface 2200 provides the user with statistics indicating how, when, and/or where a demonstration software product is being used and by who and on what platform. Data collected from a plurality sessions is collated and analyzed to provide various statistics to the user. The data may be collected, for example, by process 2100 shown in FIG. 21. In an embodiment, the data is collected anonymously or is anonymized to protect the privacy of individual users as well as to discourage users from modifying their use of the product in order to try to fit a perceived desired manner of usage. By anonymizing the data, the users reviewing the tracking data receive better data the better reflects the advantages and disadvantages of the product demonstration thereby providing better information by which to improve or modify the product demonstration to better serve the actual needs of the team utilizing the demonstration.

In an illustrative embodiment, a method, computer, and computer program product stored on non-transitory computer readable media for tracking usage of demonstration software is provided. The method includes creating, by a server, a demonstration. The demonstration includes a plurality of scenes illustrating usage of a software product. The demonstration further includes a tracker. The tracker is configured to monitor selected events and record occurrence of the selected events to a local storage on the user device. The selected events include tracking data indicative of how the demonstration is used by a user. The method further includes providing, by the server, the demonstration to a user device. The method further includes receiving, by the server, the tracking data from the user device. In an illustrative embodiment, selected events include active changes within the demonstration. In an illustrative embodiment, the selected events include at least one of a page load, a button click, a page scroll, a selection of a menu option, and entry of text in a data field. In an illustrative embodiment, the method also includes collating, by the server, data from a plurality of demonstration sessions; and determining, by the server, at least one of how often a selected feature is utilized within the demonstration, what pages are hit during a use of the demonstration, how long a demonstration takes to complete, and the devices used to present the demonstration. In an illustrative embodiment, the tracking feature is configured to be toggled on and off during build of the demonstration. In an illustrative embodiment, the tracking data is anonymized prior to presentation to a developer. In an illustrative embodiment, the method also includes storing, by the server, the tracking data to a storage device upon receipt of a tracking data completion acknowledgement from the user device; and rejecting, by the server, the tracking data when the tracking data completion acknowledgement has not been received after expiration of a time limit following receipt of first tracking data from the user device. In an illustrative embodiment, the tracker is configured to delete the tracking data from the user device upon receipt of a receipt acknowledgement from the server indicating that the server has received the tracking data. In an illustrative embodiment, the tracker is configured to delete an oldest tracking data in local storage when the local storage of tracking data exceeds a threshold such that a more recent tracking data can be stored.

Figure 23:
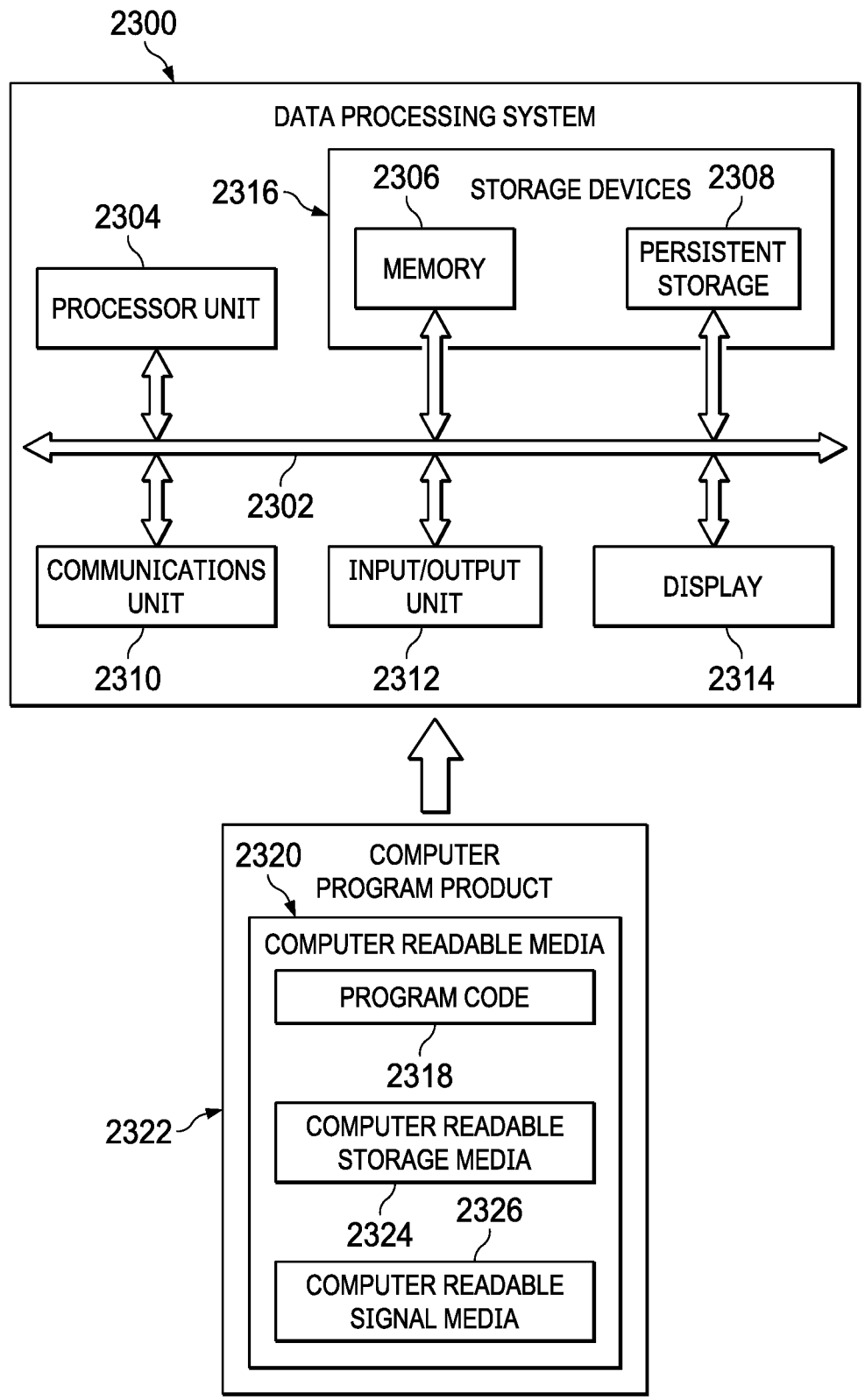
FIG. 23 is an illustration of a block diagram of a data processing system in accordance with an illustrative embodiment.

Turning now to FIG. 23, an illustration of a block diagram of a data processing system is depicted in accordance with an illustrative embodiment. Data processing system 2300 may be used to implement one or more computers, servers 104, 105, 106 and client computers 110, 112, 114 in FIG. 1. In this illustrative example, data processing system 2300 includes communications framework 2302, which provides communications between processor unit 2304, memory 2306, persistent storage 2308, communications unit 2310, input/output unit 2312, and display 2314. In this example, communications framework 2302 may take the form of a bus system.

Processor unit 2304 serves to execute instructions for software that may be loaded into memory 2306. Processor unit 2304 may be a number of processors, a multi-processor core, or some other type of processor, depending on the particular implementation. In an embodiment, processor unit 2304 comprises one or more conventional general purpose central processing units (CPUs). In an alternate embodiment, processor unit 2304 comprises one or more graphical processing units (CPUs).

Memory 2306 and persistent storage 2308 are examples of storage devices 2316. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2316 may also be referred to as computer-readable storage devices in these illustrative examples. Memory 2316, in these examples, may be, for example, a random access memory or any other suitable volatile or non-volatile storage device. Persistent storage 2308 may take various forms, depending on the particular implementation.

For example, persistent storage 2308 may contain one or more components or devices. For example, persistent storage 2308 may be a hard drive, a flash memory, a rewritable optical disk, a rewritable magnetic tape, or some combination of the above. The media used by persistent storage 2308 also may be removable. For example, a removable hard drive may be used for persistent storage 2308. Communications unit 2310, in these illustrative examples, provides for communications with other data processing systems or devices. In these illustrative examples, communications unit 2310 is a network interface card.

Input/output unit 2312 allows for input and output of data with other devices that may be connected to data processing system 2300. For example, input/output unit 2312 may provide a connection for user input through at least one of a keyboard, a mouse, or some other suitable input device. Further, input/output unit 2312 may send output to a printer. Display 2314 provides a mechanism to display information to a user.

Instructions for at least one of the operating system, applications, or programs may be located in storage devices 2316, which are in communication with processor unit 2304 through communications framework 2302. The processes of the different embodiments may be performed by processor unit 2304 using computer-implemented instructions, which may be located in a memory, such as memory 2306.

These instructions are referred to as program code, computer-usable program code, or computer-readable program code that may be read and executed by a processor in processor unit 2304. The program code in the different embodiments may be embodied on different physical or computer-readable storage media, such as memory 2306 or persistent storage 2308.

Program code 2318 is located in a functional form on computer-readable media 2320 that is selectively removable and may be loaded onto or transferred to data processing system 2300 for execution by processor unit 2304. Program code 2318 and computer-readable media 2320 form computer program product 2322 in these illustrative examples. In one example, computer-readable media 2320 may be computer-readable storage media 2324 or computer-readable signal media 2326.

In these illustrative examples, computer-readable storage media 2324 is a physical or tangible storage device used to store program code 2318 rather than a medium that propagates or transmits program code 2318. Alternatively, program code 2318 may be transferred to data processing system 2300 using computer-readable signal media 2326.

Computer-readable signal media 2326 may be, for example, a propagated data signal containing program code 2318. For example, computer-readable signal media 2326 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2300 are not meant to provide architectural limitations to the manner in which different embodiments may be implemented. The different illustrative embodiments may be implemented in a data processing system including components in addition to or in place of those illustrated for data processing system 2300. Other components shown in FIG. 23 can be varied from the illustrative examples shown. The different embodiments may be implemented using any hardware device or system capable of running program code 2318.

As used herein, the phrase "a number" means one or more. The phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item C. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer program product for tracking usage of a demonstration, the computer program product comprising a non-transitory computer-readable storage medium having program instructions embodied therewith, the program instructions executable by a server computer to cause the server computer to perform a method of:
   creating, by the server computer, the demonstration responsive to user input;
   uploading, by the server computer, a plurality of images to the demonstration;
   creating, by the server computer, a clickable hotspot on a first one of the images in response to user input;
   creating, by the server computer, a data entry display on a second one of the images in response to user input, wherein the clickable hotspot includes a data entry field that is linked to the data entry display within the demonstration, and wherein the data entry display populates a display with data entered into the data entry field such that when a user is using the demonstration, data entered into the data entry field is displayed in the data entry display, and wherein functionality of the clickable hotspot is changeable via a user interface;
   providing, by the server computer, the demonstration to a client device of the user via a network;
   receiving, by the server computer, tracking data indicative of how the demonstration is used by the user from the client device via the network;
   determining, by the server computer, whether a tracking data completion acknowledgement was received from the client device prior to expiration of a time limit following receipt of first tracking data from the client device; and
   rejecting, by the server computer, the tracking data in response to determining that the tracking data completion acknowledgement was not received from the client device prior to the expiration of the time limit following the receipt of the first tracking data from the client device.

2. The computer program product of claim 1, wherein the clickable hotspot creates an area of obfuscation to pixelate personal identifiable information on an image in the demonstration, and wherein the demonstration is editable by multiple users.

3. The computer program product of claim 1, further comprising:
formatting, by the server computer, the demonstration in a device dependent format for the client device, the device dependent format being suitable for the client device with which the user will use the demonstration.

4. The computer program product of claim 1, further comprising:
storing, by the server computer, the tracking data in a storage device of the server computer in response to determining that the tracking data completion acknowledgement was received from the client device prior to the expiration of the time limit following the receipt of the first tracking data from the client device;
deleting, by the server computer utilizing a tracking tool, the tracking data from the client device in response to the tracking tool receiving an indication that the server computer received the tracking data; and
monitoring, by the server computer, how the demonstration is used utilizing the tracking data stored in the storage device of the server computer, wherein the server computer uses the tracking data to modify the demonstration by eliminating one or more images not used.

5. The computer program product claim 1, wherein the server computer monitors how often a page in the demonstration is selected.

6. The computer program product claim 1, wherein the server computer includes templates to create the demonstration.

7. The computer program product claim 1, wherein the server computer includes a demonstration creation interface that comprises an output type selection.

8. The computer program product claim 1, further comprising:
determining, by the server computer, a device type to be used for presenting the demonstration.

9. The computer program product claim 8, further comprising:
formatting, by the server computer, the demonstration into a type suitable for the device type on which the demonstration will be presented.

10. The computer program product claim 1, further comprising:
receiving, by the server computer, user input regarding a device type to be used for presenting the demonstration.

11. The computer program product claim 10, wherein the device type comprises at least one of a web browser type, a screen size, a screen resolution, an operating system, the device type, a device memory size, and a device processing capability.

12. A method in a computer system for creating a demonstration, the method comprising:
providing, by the computer system a first interface for uploading presentation data;
receiving, by the computer system the presentation data;
providing, by the computer system, a second interface for assigning hot spots and actions associated with the hot spots to images in the presentation data;
receiving, by the computer system, an indication of a clickable hotspot on a first one of the images and associated actions from user input via the second interface, the clickable hotspot including a data entry field, and wherein functionality of the clickable hotspot is changeable via a user interface;
receiving, by the computer system, an indication of a location of a data entry display on a second one of the images in response to user input;
associating, by the computer system, a data entry display with the data entry field within the demonstration such that data entered into the data entry field is displayed in the data entry display on the second one of the images when a user is using the demonstration;
providing, by the computer system, the demonstration to a client device of a user via a network;
receiving, by the computer system, tracking data indicative of how the demonstration is used by the user from the client device via the network;
determining, by the computer system, whether a tracking data completion acknowledgement was received from the client device prior to expiration of a time limit following receipt of first tracking data from the client device; and
rejecting, by the computer system, the tracking data in response to determining that the tracking data completion acknowledgement was not received from the client device prior to the expiration of the time limit following the receipt of the first tracking data from the client device.

13. The method of claim 12, further comprising:
determining, by the computer system, a device type of the client device to be used for presenting the demonstration; and
providing, by the computer system, the demonstration to the client device in a format suitable for the client device according to the device type.

14. The method of claim 13, wherein the device type is one of auto determined and determined according to the user input.

15. The method of claim 12, wherein the clickable hotspot creates an area of obfuscation to pixelate personal identifiable information on an image in the demonstration, and wherein the presentation data is editable via a browser by multiple users.

16. The method of claim 12, further comprising:
storing, by the computer system, the tracking data in a storage device of the computer system in response to determining that the tracking data completion acknowledgement was received from the client device prior to the expiration of the time limit following the receipt of the first tracking data from the client device;
deleting, by the computer system utilizing a tracking tool, the tracking data from the client device in response to the tracking tool receiving an indication that the computer system received the tracking data; and
monitoring, by the computer system, how the demonstration is used utilizing the tracking data stored in the storage device of the computer system, wherein the computer system uses the tracking data to modify the demonstration by eliminating one or more images not used.

17. A computer for creating a product demonstration, the computer comprising:
a processor; and
a non-transitory computer readable storage medium storing program code which, when executed by the processor, performs a computer-implemented method for creating the demonstration, the program code comprising:

program code for providing a first interface for uploading presentation data;

program code for receiving the presentation data;

program code for providing a second interface for assigning hot spots and actions associated with the hot spots to images in the presentation data;

program code for receiving an indication of a clickable hotspot on a first one of the images and associated actions from user input via the second interface, the clickable hotspot including a data entry field, and wherein functionality of the clickable hotspot is changeable via a user interface;

program code receiving an indication of a location a data entry display on a second one of the images in response to user input;

program code for associating a data entry display with the data entry field within the demonstration such that data entered into the data entry field is displayed in the data entry display on the second one of the images when a user is using the demonstration;

program code for providing the demonstration to a client device of a user via a network;

program code for receiving tracking data indicative of how the demonstration is used by the user from the client device via the network;

program code for determining whether a tracking data completion acknowledgement was received from the client device prior to expiration of a time limit following receipt of first tracking data from the client device; and program code for rejecting the tracking data in response to determining that the tracking data completion acknowledgement was not received from the client device prior to the expiration of the time limit following the receipt of the first tracking data from the client device.

18. The computer of claim 17, further comprising:

program code for determining a device type of the client device to be used for presenting the demonstration; and program code for providing the demonstration to the client device in a format suitable for the client device according to the device type.

19. The computer of claim 17, wherein the clickable hotspot creates an area of obfuscation to pixelate personal identifiable information on an image in the demonstration, and wherein the presentation data is editable via a browser by multiple users.

20. The computer of claim 17, further comprising:

program code for storing the tracking data in a storage device of the computer in response to determining that the tracking data completion acknowledgement was received from the client device prior to the expiration of the time limit following the receipt of the first tracking data from the client device;

program code for deleting, utilizing a tracking tool, the tracking data from the client device in response to the tracking tool receiving an indication that the computer received the tracking data; and program code for monitoring how the demonstration is used utilizing the tracking data stored in the storage device of the computer, wherein the computer uses the tracking data to modify the demonstration by eliminating one or more images not used.

* * * * *